United States Patent [19]
Yamasaki et al.

[11] Patent Number: 5,702,604
[45] Date of Patent: Dec. 30, 1997

[54] APPARATUS AND METHOD FOR WASTE WATER TREATMENT UTILIZING GRANULAR SLUDGE

[75] Inventors: Kazuyuki Yamasaki, Hiroshima; Atsushi Yokotani; Shirou Imazu, both of Fukuyama, all of Japan

[73] Assignee: Sharp Kabushiki Kaisha, Osaka, Japan

[21] Appl. No.: 694,119

[22] Filed: Aug. 8, 1996

[30] Foreign Application Priority Data

Sep. 6, 1995 [JP] Japan ................................. 7-229144

[51] Int. Cl.$^6$ ........................................... C02F 3/30
[52] U.S. Cl. ................... 210/603; 210/605; 210/615; 210/616; 210/623; 210/151; 210/188; 210/195.1; 210/195.2; 210/903; 210/602; 210/195.3; 210/626
[58] Field of Search .................... 210/605, 603, 210/615, 616, 617, 621, 623, 626, 630, 150, 151, 188, 195.1, 195.2, 195.3, 202, 205, 218, 257.1, 257.2, 254, 259, 262, 903, 602

[56] References Cited

U.S. PATENT DOCUMENTS

| | | | |
|---|---|---|---|
| 4,479,876 | 10/1984 | Fuchs | 210/605 |
| 4,488,968 | 12/1984 | Hong et al. | 210/605 |
| 4,680,111 | 7/1987 | Ueda | 210/615 |
| 4,705,634 | 11/1987 | Reimann et al. | 210/195.3 |
| 5,254,253 | 10/1993 | Pehmann | 210/195.2 |
| 5,342,522 | 8/1994 | Marsman et al. | 210/605 |
| 5,432,988 | 7/1995 | Yamasaki et al. | 210/151 |
| 5,462,666 | 10/1995 | Kimmerl | 210/605 |
| 5,578,214 | 11/1996 | Yamasaki et al. | 210/195.2 |

FOREIGN PATENT DOCUMENTS

| | | |
|---|---|---|
| 142872 | 8/1984 | European Pat. Off. |
| 53-35251 | 4/1978 | Japan |
| 56-78691 | 6/1981 | Japan |
| 59-199098 | 11/1984 | Japan |
| 64-43306 | 2/1989 | Japan |
| 1-95000 | 4/1989 | Japan |
| 2-21000 | 2/1990 | Japan |
| 2-61424 | 5/1990 | Japan |
| 2-229595 | 9/1990 | Japan |
| 4-197497 | 7/1992 | Japan |
| 4-260497 | 9/1992 | Japan |
| 4-305287 | 10/1992 | Japan |

OTHER PUBLICATIONS

"Application of Ultrafiltration to UASB Process" (Enviromental Microbioengineering Research Practice, 1993, published by Gihodo) pp. 193–196.

Primary Examiner—Christopher Upton
Attorney, Agent, or Firm—Nixon & Vanderhye P.C.

[57] ABSTRACT

A wastewater treating apparatus has first, second and third bioreactors. Each bioreactor has, in an upper position, a reaction/sprinkling portion for exhaust gas treatment. The first bioreactor has, in a lower position, a submerged portion including an aerobic upper portion and an anaerobic lower portion. The aerobic upper portion includes a membrane filter. A membrane concentrated liquid produced by the membrane filter is introduced into a mixing tank. A mixture of an alcohol, fine powdered material and membrane concentrated liquid from the mixing tank is introduced, together with a developer-containing wastewater, into the anaerobic lower portion, so that a granular sludge is formed therein. The granular sludge contains anaerobic microorganisms in a high concentration level and is therefore capable of treating the wastewater without necessity of wastewater dilution or use of chemicals.

12 Claims, 8 Drawing Sheets

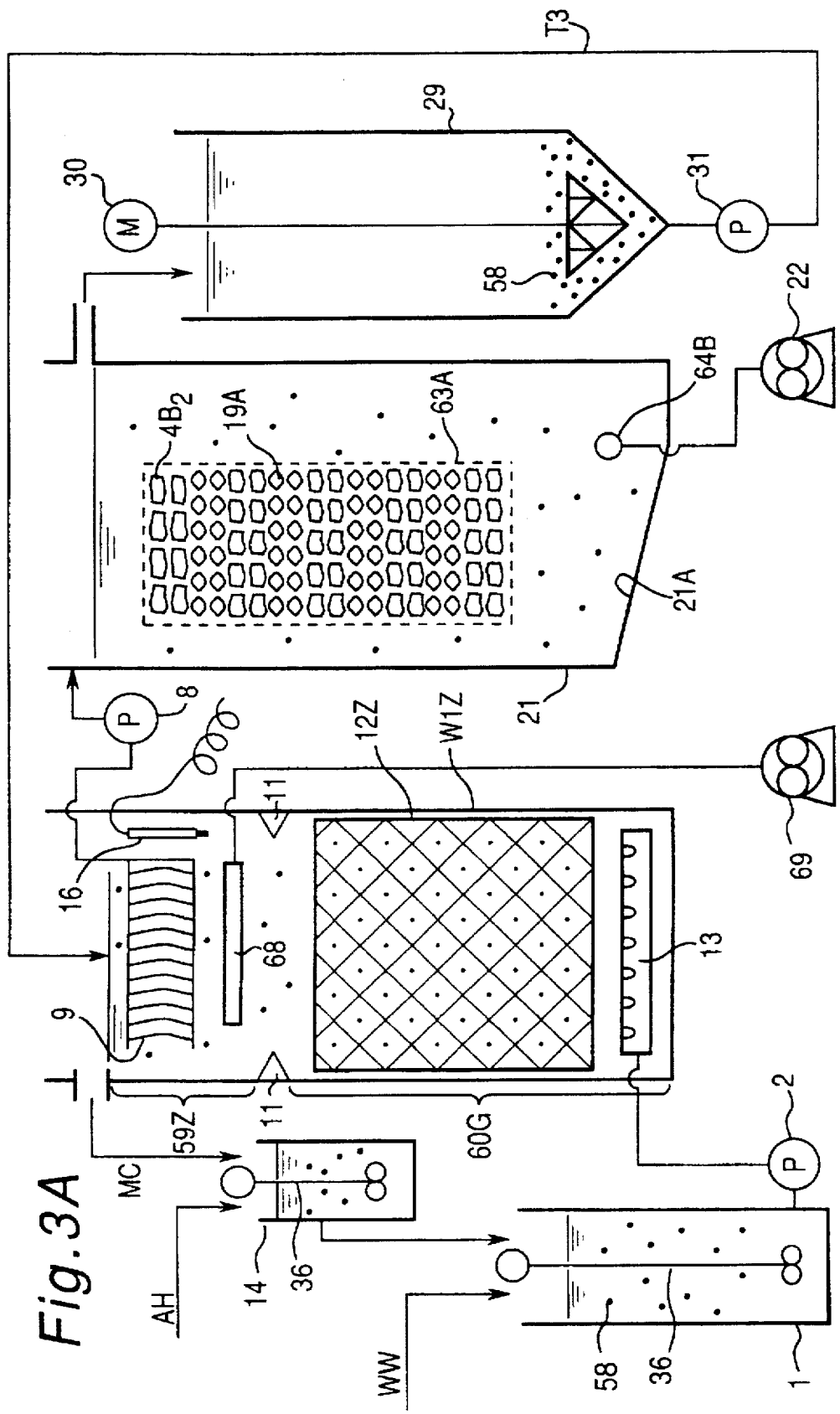

5,702,604

APPARATUS AND METHOD FOR WASTE WATER TREATMENT UTILIZING GRANULAR SLUDGE

CROSS REFERENCE TO RELATED APPLICATION

This application is related to our commonly assigned U.S. application Ser. No. 08/504,585 filed on Jul. 20, 1995 now U.S. Pat. No. 5,578,214.

BACKGROUND OF THE INVENTION

The present invention relates to an apparatus and method for wastewater treatment. More particularly, the invention relates to an apparatus and method for wastewater treatment wherein a wastewater containing nitrogen, coloring matter, surfactant, or the like in high concentration which is of organic alkaline nature with a pH of 11 or above can be biologically treated without use of any neutralizer for organic alkalis, without necessity of wastewater dilution, and without involving excess sludge generation. Further, the invention concerns an apparatus and method for wastewater treatment wherein exhaust gases having an organic matter content can be treated simultaneously with above noted wastewater.

High-concentration wastewater (e.g., developer liquid-containing wastewater) generated at any existing semiconductor plant and/or liquid crystal plant contains Tetramethyl ammonium hydroxide (TMAH), a compound indicative of biological toxicity, on the order of 2,000 to 10,000 ppm. Such a high concentration wastewater contains, in addition to TMAH, coloring matter and various types of surfactant which originate from resists. As may be seen from its molecular formula, TMAH is a compound of carbon, hydrogen, nitrogen and oxygen.

Hitherto, in the process of wastewater treatment in such a plant, various conventional techniques, such as chemical treatment (neutralization, reaction, coagulation, etc.), biological treatment (biofilm treatment, contact oxidation, activated sludge treatment, special microorganism treatment, anaerobic treatment, etc.), and physical treatment (sedimentation, filtration, adsorption, floatation, membrane treatment, etc.), have generally been employed. In some cases, these conventional methods have been respectively used alone in treating such high-concentration wastewater, and in some other cases, they have been used in combination of two or more. Wastewater treatment methods for treating such high-concentration wastewater are described in, for example, Japanese Patent Application Laid-Open Nos. 1-95000 and 64-43306. However, teachings of these publications are intended simply for TMAH treatment.

The above cited methods are simply intended to treat TMAH and are not intended for treatment of such substances as nitrogen, coloring matter, and surfactant nor yet intended to be an economical and rational wastewater treatment method which is capable of treatment of exhaust gases having an organic matter content.

In semiconductor plants and/or liquid crystal plants, one important task is to find how to solve problems arising from treated water and exhaust gases, because foaming due to any surfactant content of the treated water and an offensive odor of even a slight degree from exhaust gases are of concern to local inhabitants from the standpoint of maintenance of local environment.

Generally, for treatment of any slight amounts of surfactant and/or coloring matter contained in treated water in a final treating stage in wastewater treatment, it is a common practice to use activated carbon. However, treatment with activated carbon involves a problem that the service life of activated carbon is short and that adsorption by activated carbon tends to decrease after a certain time period, thus necessitating the transport of the activated carbon to an external location for regeneration, which is rather troublesome. Recently, various types of bio-activated carbon treatment apparatuses have been developed (as disclosed in Japanese Patent Application Laid-Open Nos. 2-229595 and 4-260497). However, they are merely directed toward purification of water of comparatively good quality, and are not intended for treatment of wastewater containing, in particular, hardly decomposable surfactant and coloring matter, treatment of which is time consuming. Further, such a bioactivated carbon treatment apparatus incorporates granulated activated carbon that involves high initial cost, and has no capability of treating malodorous gases and/or exhaust gases. In apparatuses of conventional system which use granulated activated carbon, because the activated carbon is in the form of granule, there arises a problem that a failure to adjust the backwash flow rate during a backwashing operation results in masses of granulated activated carbon being washed away out of the apparatus.

Further, an exhaust gas treatment apparatus (as described in Japanese Utility Model Application Laid-Open No. 2-61424) has been developed, but this apparatus is solely intended for treatment of an exhaust gas and not for simultaneous treatment of wastewater and exhaust gas. In this apparatus, the object gas for treatment is nitrogen oxide and not an exhaust gas with an organic matter content. The exhaust gas treatment apparatus is intended to treat exhaust gas mainly through the utilization of activated sludge. In FIG. 6 is shown an example of such an exhaust gas treatment apparatus. The exhaust gas treatment apparatus shown includes six activated carbon adsorption towers 151 such that the first two activated carbon adsorption towers 151, the second two activated carbon adsorption towers 151, i.e., third and fourth tower units, and the third two activated carbon adsorption towers 151, i.e., fifth and sixth tower units, are respectively adapted to treat exhaust gas independently of other sets of towers. In this exhaust gas treatment apparatus, organic matter adsorption is first carried out in the odd activated carbon adsorption towers 151 and, after those adsorption towers are saturated, the even activated carbon adsorption towers which are spare adsorption towers are operated for exhaust gas treatment in place of the saturated adsorption towers. Since such spare activated carbon adsorption towers are required, this exhaust gas treatment apparatus involves an increased size of installation. Another type of exhaust gas treatment apparatus is shown in FIG. 7. This apparatus includes three units of exhaust gas treating scrubbers 152. However, the apparatus is not effective for treatment of any exhaust gases containing organic matter.

As another type of prior art "water treating equipment" there is one described in Japanese Patent Application Laid-Open No. 4-305287. This equipment has a membrane filter provided in a first bioreactor unit. However, water treatment by the equipment includes no stereoscopic anaerobic treating stage as a pretreatment stage prior to membrane filtration. More specifically, the equipment does not utilize granular sludge containing mainly anaerobic bacteria and has no stage for high-efficiency anaerobic treatment of the water to be treated. The equipment is designed for a reverse osmosis membrane treatment.

There are also known a denitrification tank for wastewater treatment (as described in Japanese Utility Model Application Laid-Open No. 2-21000) and a method for treatment of water containing nitrogen compounds (as described in Japanese Patent Application Laid-Open No. 53-35251). However, these are not capable of exhaust gas treatment.

Anyway, with the above noted prior art methods and apparatuses, it is not possible to treat wastewater containing high-concentration developer liquids generated particularly at semiconductor and liquid crystal plants in a rational and economical manner and on a compact scale without using neutralizing agents and without involving generation of excess sludge, and on a non-dilution basis. The term "wastewater containing high-concentration developer liquids" herein means an organo-alkaline wastewater containing, in large quantities, hardly decomposable surfactant and colorant components which are less biodegradable and treatment of which requires a lengthy time period.

With the above-mentioned prior art techniques, it is not possible to obtain more than treated water of such a quality level that the treated water is very foamy due to hardly decomposable surfactant components therein. Therefore, such treated water may possibly affect the biological ecosystem in a river or stream flowing in a region or area having good natural environment, including small fishes and "semisulcospira libertina", a kind of spiral shell which fireflies feed on.

Also, it has been known to treat high-concentration wastewater by diluting the same to the order of ten times, for example, but this requires a wastewater treating equipment of extra-large scale and uneconomical.

Recently, various types of apparatuses for treating wastewater by utilizing a filter membrane to increase the microbial concentration of the wastewater have been gaining popularity. However, such apparatuses involve the problem of membrane clogging and necessity of periodical cleaning of the membrane itself.

Next, one example of conventional apparatuses for treating developer-containing wastewater is shown in FIG. 5. In this wastewater treating apparatus, the influent wastewater, i.e., developer-containing wastewater, is initially anaerobically treated in an anaerobic tank 101 and is then introduced into an aerobic tank 102 for aerobic treatment. Here, reference numeral 111 indicates a blower. Then, the treated water from the aerobic tank 102 is introduced into a first settling tank 103 in which precipitation occurs for solid-liquid separation. The precipitate is returned to the aerobic tank 102. Then, a supernatant liquid from the first settling tank 103 is introduced into an aerobic tank 104 which functions as a contact oxidation tank, in which the supernatant liquid is aerobically treated while being subjected to aeration. The treated water from the aerobic tank 104 is introduced into a denitrification tank 105 in which the water is denitrified. The treated water is then transferred from the denitrification tank 105 into a reaeration tank 106 in which the water is reaerated. Next, the treated water is introduced into a second settling tank 107 in which the water is subjected to solid-liquid separation. and the resulting precipitate is returned to the reaeration tank 106. Next, the treated water is transferred from the second settling tank 107 into a pit 108 from which it is introduced into a rapid filtration tower 109. After filtration in the rapid filtration tower 109, the treated water is introduced into an activated carbon adsorption tower 110 for treatment by activated carbon, and is then discharged as treated water.

In this way, the wastewater treatment apparatus shown in FIG. 5 treats developer-containing wastewater through a combination of anaerobic treatment and aerobic treatment.

The denitrification tank 105 in the above described conventional developer-containing wastewater treating apparatus is one which, as shown in FIG. 5, simply maintains treated water in an anaerobic condition within the denitrification tank 105 which is held in a substantially closed condition, or one which is packed with fillers, such as charcoal, on which denitrifying bacteria are immobilized. As may be understood from this prior art arrangement, it has been a common practice to employ the activated carbon adsorption technique for treatment of colorant components in wastewater (i.e., treatment for reducing the chromaticity of the wastewater). In such process of activated carbon adsorption, after colorant components have been adsorbed on the activated carbon, it is necessary that the activated carbon be regenerated at a separate location. Therefore, operations for removal of the activated carbon from the activated carbon tower and regeneration of the activated carbon are required. This is a problem because it involves exceptionally high running cost.

Hitherto, at many industrial facilities and research institutes, plannings for wastewater treating equipment for treatment of wastewater containing less degradable chemical substances, such as developer-containing wastewater, have been made separately from plannings for organic matter-containing exhaust gas treating equipment.

That is, while wastewater has been treated in a wastewater treating apparatus, organic matter-containing exhaust gases, more specifically exhaust gases containing organic matter represented by organic solvents, such as isopropyl alcohol (hereinafter referred to as "IPA"), have been treated in an exhaust gas treating apparatus adopting the activated carbon adsorption system and/or the combustion system, separately from wastewater.

As another type of prior art method for wastewater treatment, a method in which microorganisms are granulated so as to be held in high concentration is described in a research paper under the title "Application of Ultrafiltration to UASB Process" ("Environmental Microbioengineering Research Practice", 1993, published by Gihodo). The term "UASB" is an abbreviation for Up-flow Anaerobic Sludge Blanket.

In this prior art method, however, the object of treatment is limited to food industry related wastewater of soluble saccharine type. According to this method, a wastewater containing a substrate of the saccharine system is generally granulated for utilization.

As a matter of practice, where developer-containing wastewater is a sole object of treatment, granular sludge dominated by anaerobes cannot be easily formed even if ultrafilter membranes are used. Without granular sludge being formed, it is not possible to carry out such high-concentration anaerobic treatment as in the UASB process in which the concentration of mixed liquor suspended solids (MLSS) is of the order of 40,000 ppm.

In the art of wastewater treatment, it is known to treat wastewater in one bioreactor (single tank system) in which both an aerobic condition and an anaerobic condition are present (as described in Japanese Patent Application Laid-Open Nos. 56-78691 and 4-197497). Also, it is known to carry out wastewater treatment by employing one bioreactor in which fillers are placed (as described in Japanese Patent Application Laid-Open No. 59-199098).

However, there is known no technology of forming granular sludge in the wastewater so that the concentration of MLSS is increased up to the order of 40,000 ppm to enable treatment of the wastewater in a highly anaerobic condition.

In such background situation as described above, production facilities and research institutes have hitherto been forced to plan construction of high-cost treatment apparatus, whether for wastewater treatment or for exhaust gas treatment, and this has been a cause of lowered investment efficiency at those facilities and/or institutes.

Hitherto, where wastewater containing less degradable chemical substances, more particularly, nitrogen (for example, developer-containing wastewater) is of high concentration, and where such high-concentration wastewater is to be microbiologically treated, it has been necessary to dilute the wastewater. However, in order to dilute the wastewater, it is necessary to increase the capacities of component units of the wastewater treatment apparatus, such as aeration tanks and settling tank. Naturally, this involves the problem of higher costs, i.e., increased initial costs and increased running costs.

For the treatment of exhaust gases and offensive odor gases (organic matter-containing exhaust gases emitted from production facilities and offensive odor gases from wastewater treatment equipment itself), various systems have been known including activated carbon adsorption system and combustion system. However, these systems involve several problems, including high initial costs, high running costs, high maintenance costs, and increased space requirement for installation.

It is anticipated that the regulation of nitrogen and phosphorus emissions under the water pollution control law (as in Japan) will become more stringent in the future. Therefore, for treatment of waste liquor containing nitrogen in an unacceptably large proportion as wastewater containing developer used in a voluminous amount especially at semiconductor and liquid crystal plants at large, there is a need for a developer-containing wastewater treatment apparatus which is capable of treating even nitrogen to a great extent and which is more efficient and yet economical. More specifically, a wastewater treating apparatus is required which can positively and more efficiently treat not only such substances as TMAH, colorant components, surfactant, and COD, but also nitrogen which are contained in developer liquors.

Semiconductor and liquid crystal plants also emit various offensive odor gases and exhaust gases, though small in quantity. Specifically, they include exhaust gases originating from organic solvents used in the manufacturing process and small quantities of offensive odor gases occurring from the wastewater treatment apparatus itself which is employed in treating developer-containing wastewater. Naturally, where an anaerobic operation stage for denitrification is incorporated in the wastewater treating process in connection with the treatment of developer-containing wastewater, there occurs offensive odor generation.

Though slight those gases are, they may possibly affect the local environment in any environmentally favorable district. However, it would be unrealistic and excessive to construct a common odor treatment equipment simply for the treatment of small quantities of odor gases. Plannings made for treatment of such gases have resulted in uneconomical increase in the costs of construction and maintenance of such odor treatment equipment.

In such environmental situation of semiconductor and liquid crystal plants, it has been strongly desired that a novel wastewater treatment apparatus be developed which is capable of treating both high-concentration developer-containing wastewater and organic matter-containing exhaust gases, and yet is economical in respect of both initial costs and running costs, and small in size.

As already noted, in order to treat substances in developer-containing wastewater, including TMAH, surfactant, COD, total nitrogen, and colorant components (color), offensive odor from the wastewater treating equipment itself, and exhaust gases originating from the production equipment within the plant, conventional wastewater treating methods require a large number of apparatuses; and therefore, if construction plans are separately made for those apparatuses, construction costs required will be very high. The apparatuses required in that case are: (1) an apparatus for treatment of TMAH and nitrogen compounds (an anaerobic tank and an aeration tank); (2) a treating unit for treatment of surfactant (a contact oxidation tank); (3) a denitrification tank and a reaeration tank; (4) an apparatus for treatment of SS (Suspended Solids)(a filter tank); (5) an apparatus for treatment of colorant components (color) (an activated carbon adsorption tower and an oxidation-by-ozone tank); and (6) an apparatus for treatment of offensive odor and exhaust gases (an exhaust gas treating apparatus).

SUMMARY OF THE INVENTION

Accordingly, the present invention is intended to solve all aforesaid problems with the aforesaid conventional wastewater treating methods and exhaust gas treating methods simultaneously.

More specifically, it is an object of the invention to provide a highly efficient, simple, compact, and economical apparatus and method for wastewater treatment which can treat organo-alkaline high-concentration wastewater that contains less gradable chemical substances (e.g., TMAH) including nitrogen and also contains surfactant and color components, to such an extent that the resulting treated water is harmless to the biological ecosystem inhabiting an environmentally favorable region or area. It is a further object of the invention to provide an apparatus and method for wastewater treatment which can surely treat even small amounts of exhaust gases (offensive odor gases and exhaust gases) as well as the high-concentration wastewater.

In order to accomplish the above object, the present invention provides an apparatus for wastewater treatment, comprising:

a storage tank to which wastewater to be treated is introduced, the storage tank having agitation means;

a first bioreactor having a first wastewater treatment portion which includes an anaerobic portion for anaerobically treating the wastewater introduced from the storage tank and an aerobic portion for aerobically treating the wastewater already treated in the anaerobic portion, wherein the aerobic portion includes a membrane filter and the wastewater passing through the membrane filter is discharged from the first bioreactor;

a mixing tank to which a membrane concentrated liquid produced by the membrane filter in the aerobic portion of the first bioreactor, an alcohol, and fine powered material are introduced to be mixed therein, the mixing tank supplying the resulting mixture to the storage tank;

a second bioreactor having a second wastewater treatment portion for aerobically treating the wastewater received from the first bioreactor, the second wastewater treatment portion containing charcoal and calcium carbonate mineral; and means for introducing the wastewater from the storage tank into the first bioreactor, and from the first bioreactor into the second bioreactor.

In the treating apparatus of the above described arrangement, developer-containing wastewater is first introduced into the storage tank. In addition to the developer-containing wastewater, a mixture of the alcohol, the membrane concentrated liquid, and the fine powdered material which mixture has been previously prepared in the mixing tank is introduced into the storage tank. The membrane concentrated liquid contains soluble organic matter and colloidal organic matter having a molecular weight of 30,000 or more, and aerobic microorganisms. In the mixing tank, the aerobic microorganisms die under the sterilizing action of the alcohol. With the developer-containing wastewater alone, sludge granulation does not proceed in the anaerobic portion, but when the membrane concentrated liquid, the alcohol, and the fine powdered material are added to the wastewater, the configuration, or property, of the developer-containing wastewater changes physico-chemically and the process of granulation mainly of anaerobes proceeds. Reasons for this are that the soluble and the colloidal organic substances having a molecular weight of 30000 or more contained in the membrane concentrated liquid accelerate such granulation, that the alcohol prompts the process of granulation mainly of the anaerobes, and that the fine powdered material acts as nuclei of the granular sludge to allow the process of further granulation. Further, it has been found by experiments that the alcohol, a hydrogen donor, is more effective in progressing further granulation than other hydrogen donors, e.g., organic acids and saccharide.

Therefore, in the anaerobic portion of the first bioreactor, the high-concentration developer-containing wastewater is anaerobically treated by the granular sludge with microorganisms retained in high concentration therein, without dilution and without the use of any neutralizing agent. In such high-concentration anaerobic treatment, self-digestion of sludge by anaerobic bacteria progresses and there is no occurrence of excess sludge. Carbon-dominated organic substances are decomposed to methane gas and the like by anaerobic bacteria.

Needless to say, developer-containing wastewater contains TMAH, COD, surfactants, nitrogen, color components, etc. in high concentration. Of these components, TMAH, surfactants and color components are hardly decomposable components from the view point of microbial treatment. The wastewater is introduced into the anaerobic portion of the first bioreactor. The anaerobic portion of the first bioreactor is in an anaerobic condition created by self-granulated masses of granular sludge, and the microbial concentration therein is 40,000 ppm or more in terms of the MLSS; therefore, even hardly decomposable components can be effectively treated. After having been continuously introduced into the anaerobic portion, and with lapse of time, the organic matter-containing wastewater is subject to vigorous action of anaerobic microorganisms contained in granular sludge. In this way, the anaerobic portion of the first bioreactor is constantly in an anaerobic condition so that anaerobic microorganisms can grow to high concentration, thus anaerobically treating organic matter.

Thereafter, the wastewater (water being treated) which has been subjected to vigorous anaerobic treatment by anaerobes and has lost viscosity, flows upward within the first bioreactor and is introduced into the aerobic portion of the first bioreactor. The aerobic portion of the first bioreactor includes aerobic microorganisms grown therein. This aerobic portion is held in an aerobic condition so that aerobic microorganisms can aerobically treat the anaerobically treated organic matter. Membrane filters, such as ultrafilter membrane or precision membrane, are disposed in the aerobic portion, and by such membrane filter the wastewater is separated into membrane concentrated liquid and flitrate. The concept of carrying out aerobic treatment after anaerobic treatment is basically same as that in the case where high-concentration excretas at large are first anaerobically treated, then aerobically treated. All organic substances contained in the developer-containing wastewater are first effectively and vigorously treated by anaerobic microorganisms through decomposition and digestion in the anaerobic portion in which anaerobe dominated granular sludge is present. Next, the organic substances are aerobically treated in the aerobic portion. This aerobic treatment is a unique aerobic treatment. More specifically, the process of aerobic treatment comprises a step of treating organic matter through changes in the concentration of microorganisms, and a step of treating by a mixture of aerobic and anaerobic microorganisms. Through this unique aerobic treatment, organisms can be efficiently decomposed. During this unique process of aerobic treatment, the wastewater is liable to become denitrified.

To summarize, main functions of microorganisms within the first bioreactor are as follows. (1) Organic substances contained in the wastewater are first digested by anaerobic microorganisms in the anaerobic portion of the first bioreactor. (2) Then, nitrogen compounds contained in the wastewater are oxidized (nitrified) by aerobic microorganisms in the aerobic portion of the first bioreactor. (3) Then, the wastewater is denitrified by anaerobic microorganisms present in the aerobic portion of the first bioreactor. The water under treatment which has been subjected to the microbial actions of (1), (2), and (3) has already changed in its configuration such that the water is unlikely to cause clogging of the membrane filter. In case that a membrane filter diffuser for air cleaning the membrane surface is disposed at a lower portion of the membrane filter, it is possible to clean the membrane filter by air discharged from the diffuser thereby to avoid clogging of the membrane filter. Membrane filters are used in continuous wastewater treating apparatuses, and can filter not only macromolecular organic substances such as protein, but also even comparatively fine microorganisms such as virus and the like. When the membrane filter is an ultrafilter membrane, it can remove all such items as particulate matter, bacteria, and virus in the water to be treated, and also a part of dissolved organic matter in a colloidal region. When the membrane filter is a precision filter, it can remove all such items as particulate matter and bacteria, a part of virus, and a part of dissolved organic matter in a colloidal region.

Next, the water under treatment is introduced from the first wastewater treatment portion of the first bioreactor into the second wastewater treatment portion of the second bioreactor. The water under treatment is aerobically treated by microorganisms grown in biofilms on the surfaces of and in the interior of the charcoal and calcium carbonate mineral filled in the second wastewater treatment portion. Microorganisms immobilized to the charcoal in the second wastewater treatment portion grow on organic matter in the wastewater as source of their nutrient. Charcoal is a porous material having a multiplicity of fine pores of various diametrical sizes ranging from several microns up to several hundred microns. Therefore, charcoal allows easy growth of various kinds of microorganisms. Since charcoal has various sizes of pores, it allows epiphytic growth of microorganisms fit to the different pore sizes so that biofilm layers are formed both internally and externally of the charcoal. Such biofilm layers adsorb and biodegrade chemical substances, such as less degradable surfactants and color components, which are generally difficult to biodegrade. Examples of microorganisms which often grow on charcoal are bacteria, fungi, ray fungi, algae, and photosynthesis bacteria. It is reported that the surface area per gram of charcoal is 200 $m^2$ or more (according to "Zenkoku Mokutan Kyokai", a national charcoal association in Japan). This means that aforesaid biofilm layers have an exceedingly large surface area, and hence, have an exceedingly high capability of treating organic matter.

In the second wastewater treatment portion, substances to be treated are first adsorbed by the charcoal, and then hardly degradable substances, such as surfactant and color component, are biologically treated by a wide range of types of microorganisms propagated on and in the charcoal. On the other hand, various kinds of microorganisms also grow on the calcium carbonate mineral by taking in organic matter in the water being treated as their nutrients, and therefore the water being treated are treated by the various kinds of microorganisms. As nitrogen compounds in the water being treated are treated, with the result that there occurs an increase in the amount of nitrite nitrogen and nitrate nitrogen, the pH in the water being treated goes to the acid side. Then, the calcium carbonate mineral automatically acts to neutralize the pH which has shifted to the acid side.

In an embodiment, the apparatus for wastewater treatment further comprises means for returning the wastewater discharged from the second bioreactor to the first bioreactor, the discharged wastewater containing biofilm sludge and the fine powdered material.

In this case, formation of granular sludge in the anaerobic portion of the first bioreactor can be accelerated. Further, the water being treated is allowed to flow in circulation to go into frequent contact with biofilms formed on the charcoal in the second bioreactor, whereby the less degradable organic matter, such as surfactant and color component, can be catalytically decomposed to a highly acceptable level.

In an embodiment, the aerobic portion of the first bioreactor further includes vinylidene chloride fillers placed below the membrane filter.

In this case, the vinylidene chloride fillers provide a favorable environment for growth of various kinds of microorganisms, mainly aerobic ones. Therefore, in the aerobic portion a unique aerobic treatment is carried out very efficiently by utilizing aerobic microorganisms in larger proportions in combination with anaerobic microorganisms. When an diffuser for circulation purpose is provided below the vinylidene chloride fillers, the aerobic condition in the aerobic portion can be positively maintained. Further, when a membrane filter diffuser is provided below the membrane filter, the air discharged from the diffuser will prevent the membrane filter from clogging and will also serve to positively maintain the aeration portion in an aerobic condition.

In an embodiment, the first bioreactor further comprises:

a first exhaust gas treatment portion disposed above the aerobic portion for treating exhaust gas, the first exhaust gas treatment portion being packed with charcoal and plastic fillers;

means for introducing exhaust gas into a lower portion of the first exhaust gas treatment portion such that the introduced exhaust gas goes upward through the charcoal and plastic fillers in the first exhaust gas treatment portion;

means for returning the wastewater discharged from the second bioreactor to the first bioreactor; and sprinkling means for sprinkling the return wastewater on the charcoal and the plastic fillers in the first exhaust gas treatment portion such that the sprinkled wastewater goes downward through the charcoal and plastic fillers while coming into contact therewith before the wastewater falls into the aerobic portion.

In this case, the exhaust gas introduced by the exhaust gas introduction means is treated in the first exhaust gas treatment portion. More specifically, the wastewater from the second bioreactor is sprinkled over the charcoal and plastic fillers in the first reaction exhaust gas treatment portion, whereby biofilms are created on the charcoal and the plastic fillers, so that the organic components contained in the exhaust gas are biologically treated by the biofilms. Further, the biofilms are capable of treating substances difficult to degrade, such as surfactants and color components, which are contained in the water being treated. Substances in the exhaust gas, mainly organic components, serve as a source of nutrients for microorganisms. Therefore, the present arrangement enables treatment of not only organic matter-containing wastewater, but also exhaust gases. In addition, the arrangement provides for further improvement of the wastewater treating capability.

In an embodiment, the second bioreactor further comprises:

a second exhaust gas treatment portion disposed above the second wastewater treatment portion for treating exhaust gas, the second exhaust gas treatment portion being packed with charcoal and plastic fillers;

means for introducing exhaust gas into a lower portion of the second exhaust gas treatment portion such that the introduced exhaust gas goes upward through the charcoal and plastic fillers in the second exhaust gas treatment portion; and sprinkling means for sprinkling the wastewater coming from the second wastewater treatment portion on the charcoal and the plastic fillers in the second exhaust gas treatment portion such that the sprinkled wastewater goes downward through the charcoal and plastic fillers while coming into contact therewith before the wastewater falls into the second wastewater treatment portion.

In this case, exhaust gases can be biologically treated not only in the first exhaust gas treatment portion of the first bioreactor, but also in the second exhaust gas treatment portion. Therefore, this arrangement provides two times as much exhaust gas treating capacity as that of the arrangement in the preceding embodiment.

In an embodiment, the apparatus of wastewater treatment further comprises a denitrification tank for denitrifying the wastewater received from the second bioreactor, the denitrification tank containing denitrifying bacteria, the fine powdered material, vinylidene chloride fillers, and circulation means for circulating the wastewater in the denitrification tank so as to allow the wastewater to pass through the vinylidene chloride fillers.

In this wastewater treating apparatus, the water to be treated can be denitrified by the denitrifying bacteria immobilized to the fine powder. In order to enhance the effect of such denitrification, it is essential to culture denitrifying bacteria to a high concentration level per unit capacity. Therefore, denitrifying bacteria are immobilized to particles of the powder (preferably porous fine powder particles having a large surface area), and in order to take advantage of the fact that those particles of the fine powder material are prone to attach to the vinylidene chloride fillers, the tank is packed with the vinylidene chloride fillers such that the fine powder particles are placed uniformly throughout the tank. According to this arrangement, high-concentration denitrifying bacteria are stably maintained so as to be enabled to exhibit a good denitrifying performance.

In an embodiment, the apparatus further comprises a third bioreactor which includes:

a third wastewater treatment portion for treating the wastewater received from the denitrification tank, the third wastewater treatment portion containing charcoal and plastic fillers;

a third exhaust gas treatment portion located above the third wastewater treatment portion;

means for introducing exhaust gas into a lower portion of the third exhaust gas treatment portion such that the introduced exhaust gas goes upward through the charcoal and plastic fillers in the third exhaust gas treatment portion;

a hydroponic portion located adjacent the third exhaust gas treatment portion, within which plants are hydroponically cultivated by the wastewater supplied from the third wastewater treatment portion; and pumping means for pumping up the wastewater from the third wastewater treatment portion to the hydroponic portion, the hydroponic portion outputting the wastewater therein to the third exhaust gas treatment portion, and the exhaust gas passed through the charcoal and plastic fillers in the third exhaust gas treatment portion entering the hydroponic portion to come into contact with leaves of the plants.

According to this arrangement of the wastewater treatment apparatus, the wastewater to be treated is further anaerobically treated by the third wastewater treatment portion located in a lower position in the third bioreactor, and in addition the water to be treated is further aerobically treated by the third exhaust gas treatment portion located in a higher position. Further, the pump means is operative to introduce the water under treatment from the wastewater treatment portion into the third exhaust gas treatment portion through the hydroponic portion. Therefore, nitrogen compounds in the water under treatment are absorbed by roots of the plants cultivated in the hydroponic portion, whereby a high level treatment of the nitrogen compounds is accomplished. Trace amounts of minerals, such as potassium and magnesium, are eluted into the water under treatment from masses of charcoal, a natural material, which are packed in the first, second and third exhaust gas treatment portions and also in the second and third wastewater treatment portions, and this enables cultivation of plants through supply of the wastewater. On the other hand, calcium elutes from the calcium mineral that is retained, together with charcoal, in each of the second and third wastewater treatment portions. Such eluted calcium serves to assist in the growth of the plants. The plants are preferably of evergreen type which are hydroponically cultivable and remain unwithered throughout the year. If the temperature of the hydroponic portion is maintained constant, it is possible to cultivate begonia, a fast-growing evergreen plant. Through utilization of the absorbing capability of the root of the begonia plant it is possible to treat, to a high degree, a nitrogen compound present in the form of nitrate nitrogen in the wastewater. Leaves of the plant, which are exposed to treated gases, serve as aid for monitoring the condition of exhaust gas treatment.

In an embodiment, the apparatus for wastewater treatment further comprises:

a settling tank for separating sludge from the wastewater received from the third bioreactor, the sludge containing a biofilm sludge and the fine powdered material;

sludge return means for returning the sludge from the settling tank to at least one of the first exhaust gas treatment portion, the second exhaust gas treatment portion, the denitrification tank and the third exhaust gas treatment portion.

According to this arrangement, through the utilization of the biofilm sludge, exhaust gases introduced are treated to a high degree in the first, second and third exhaust gas treatment portions. Further, the biofilm sludge and fine powder particles are introduced into the first, second and third wastewater treatment portions to be utilized in treating the water to a highly acceptable degree.

In the current situation that more severe control on nitrogen is anticipated under the revision of the water pollution control law (as in Japan), the present invention is directed to treating nitrogen compounds contained in wastewater and accordingly it provides a rational, economical, and compact wastewater treating apparatus for treatment of wastewater containing nitrogen, etc., as already described. In order to provide a compact wastewater treating apparatus, according to the invention, the concentration of microorganisms is increased up to such a limit as about 40,000 ppm in terms of MLSS. One feature of the invention lies in the formation of granular sludge by which a sludge having an MLSS concentration of 40,000 ppm is created.

The present invention further provides a method for wastewater treatment, comprising the steps of:

mixing an alcohol with wastewater to be treated and introducing the mixture into an anaerobic lower portion of a first bioreactor;

aerobically treating the wastewater reaching an aerobic upper portion of the first bioreactor from the anaerobic lower portion;

passing the aerobically treated wastewater through a membrane filter to obtain a filtrate and a membrane concentrated liquid;

introducing the filtrate into a wastewater treatment portion of a second bioreactor which contains charcoal and calcium carbonate mineral, and aerobically treating the filtrate through an action of aerobic microorganisms grown on the charcoal and calcium carbonate mineral; and mixing the membrane concentrated liquid with the alcohol, then blending the mixture of the alcohol and the membrane concentrated liquid with wastewater to be treated, then introducing the blend into the anaerobic lower portion to produce granulated sludge.

In an embodiment, the wastewater treatment method further comprises the step of introducing a fine powdered material into the anaerobic lower portion of the first bioreactor. The presence of the fine powder further accelerates formation of the granular sludge.

Further, in an embodiment, an exhaust gas treatment portion packed with charcoal and plastic fillers is provided above the aerobic upper portion, and the method further comprises the steps of sprinkling the wastewater discharged from the wastewater treatment portion of the second bioreactor on the charcoal and plastic fillers in the exhaust gas treatment portion; and introducing exhaust gas into a lower portion of the exhaust gas treatment portion to let the introduced exhaust gas upward through the charcoal and plastic fillers in the exhaust gas treatment portion. This wastewater treatment method can treat even exhaust gas efficiently through utilization of the wastewater.

As seen from the above, according to the present invention, an economical apparatus and method is provided which can surely provide treated water that has been surely treated. The invention provides a novel wastewater treatment apparatus which is simple and compact in construction and yet can sterically treat both wastewater and exhaust gas.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3A is a schematic diagram showing a modification of the third embodiment of FIG. 3;

DETAILED DESCRIPTION OF THE PREFERRED EMBODIMENTS

Figure 1:
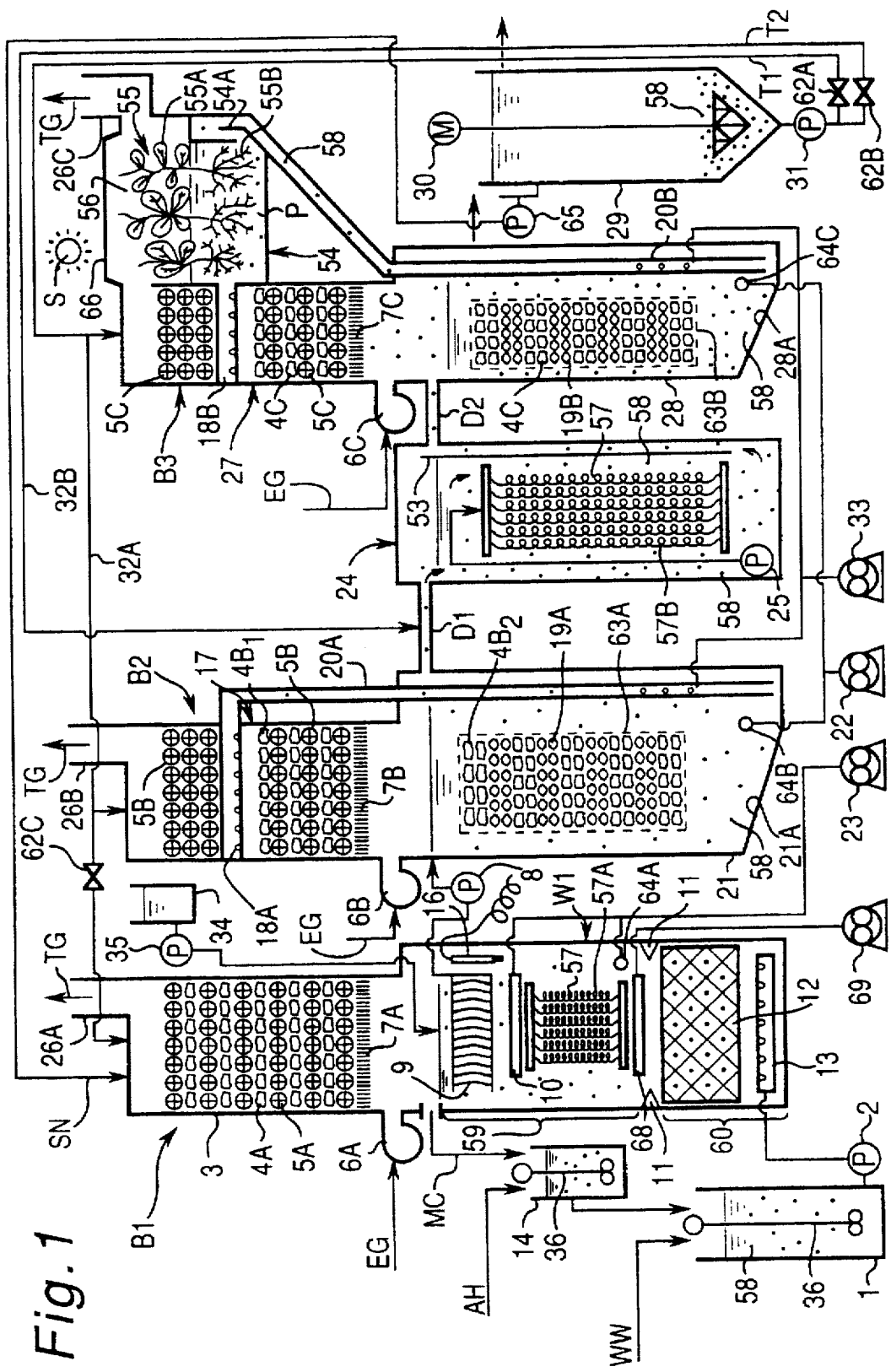
FIG. 1 is a schematic diagram showing a first embodiment of the wastewater treatment apparatus of the invention.

Preferred embodiments of the present invention will now be described with reference to the accompanying drawings.
First Embodiment In FIG. 1 there is schematically shown a first embodiment of the wastewater treatment apparatus in accordance with the invention. The wastewater treatment apparatus of this first embodiment includes a storage tank 1, an alcohol/membrane-concentrated-liquid mixing tank 14, a first bioreactor B1, a second bioreactor B2, a denitrification tank 24, a third bioreactor B3, and a settling tank 29. This first embodiment is an apparatus which is capable of treating a high-concentration developer-containing wastewater having nitrogen, surfactant and colorant component contents, and an organic matter-containing exhaust gas. The embodiment is characterized in that a granular sludge in which anaerobic bacteria are dominantly present is formed in a lower portion of the first bioreactor B1; in that a unique denitrification tank 24 is provided; and in that the third bioreactor B3 includes an hydroponic portion.

The storage tank 1 includes an agitator 36. Wastewater from the storage tank 1 is introduced by a storage tank pump 2 into the first bioreactor B1. Into the storage tank 1 is introduced high-concentration developer-containing wastewater that is discharged from semiconductor and/or liquid crystal plants. Also, into the storage tank 1 is introduced a mixture of a specific alcohol, membrane concentrated liquid, and fine powder material from the alcohol/membrane-concentrated-liquid mixing tank 14. In the figure, the developer-containing waste water, the alcohol, and the membrane concentrated liquid are indicated by reference symbols WW, AH, and MC, respectively. Liquids introduced into the storage tank 1 are agitated by the agitator 36 and mixed together. For the alcohol AH it is possible to use methanol, ethanol, isopropanol, and various other types of alcohol, but from the view point of efficiency in the formation of granular sludge which will be hereinafter described, methanol is most preferred. Pulverized coal or pulverized charcoal is used for the fine powder material, though other pulverized materials, such as powdered zeolite and diatomire, can be used. It is noted, however, that pulverized coal and pulverized charcoal are most preferred from the view points of chromaticity and microbial immobilization.

The alcohol/membrane-concentrated-liquid mixing tank 14 includes an agitator 36. Into this mixing tank 14 are introduced a supernatant liquid in an upper portion 59 of the first bioreactor B1 as a membrane-concentrated liquid, and methanol.

The first bioreactor B1 includes a first reaction/sprinkling portion (a first exhaust gas treatment portion) 3 provided in an upper position, and a submerged portion (a first wastewater treatment portion) W1 provided in an lower position. The first bioreactor B1 also has an exhaust fan 6A for introducing organic matter-containing exhaust gas, indicated by a reference symbol EG in the figure, into the space between the first reaction/sprinkling portion 3 and the submerged portion (a first contact/circulation portion) W1. The first reaction/sprinkling portion 3 also has a stack 26A disposed at a topmost location for discharging a treated gas TG. The first reaction/sprinkling portion 3 includes charcoal 4A and plastic fillers 5A. Layers of charcoal 4A and layers of plastic filler 5A are alternately stacked on a lattice plate 7A. The submerged portion W1 has the aerobic upper portion 59 and an anaerobic lower portion 60. The lattice plate 7A may specifically be one selected from commercially available heavy-duty gratings and the like.

The upper portion (an aerobic portion) 59 includes, in the sequential order from top, a membrane filter 9, a dissolved oxygen meter 16, a membrane filter diffuser 10, a vinylidene chloride filler portion 57A, a circulating diffuser 64A, and a sludge separating diffuser 68. The membrane filter 9 consists of a plurality of membrane filters arranged in laterally spaced relation. A lift pump 8 is connected to the membrane filter 9 for extracting a filtrate from the membrane filter 9. The dissolved oxygen meter 16 is disposed adjacent the membrane filter 9 for measuring the quantity of dissolved oxygen in the vicinity of the membrane filter 9. The membrane filter diffuser 10 is connected to a membrane cleaning blower 23 and is adapted to discharge air supplied by the blower 23 thereby to remove substances deposited on the surface of the membrane filter 9. The membrane filter 9 can be selected from submerged type precision filter membranes and ultrafilter membranes. As a typical example of submerged type precision filter membrane may be mentioned a hollow thread membrane produced by Mitsubishi Rayon Co., Ltd.; and as a typical example of submerged type ultrafilter membrane may be mentioned a plain membrane produced by Kubota Corporation. The ultrafilter membrane is capable of removing all such fine particles, bacteria, and viruses as are present in the water being treated, and even a part of dissolved organic matter in a colloidal region. The precision filter membrane is capable of removing all fine particulate and bacteria in the water being treated, a part of viruses therein, and even a part of dissolved organic matter in a colloidal region.

The vinylidene chloride filler portion 57A includes plural vinylidene chloride fillers 57 arranged in a laterally spaced relation and between two vertically spaced plates. The sludge separating diffuser 68 is disposed below the vinylidene chloride filler portion 57A. This diffuser 68 has a function of discharging the air from a blower 69 thereby to separate sludge deposited on the vinylidene chloride fillers. Disposed adjacent the vinylidene chloride filler portion 57A is the circulating diffuser 64A which has a function of discharging the air from the membrane cleaning blower 23 thereby to cause convection of the water being treated in the upper portion 59. The upper portion 59 receives nutriment from a nutriment tank 34 through a nutriment pump 35.

A partition wall 11 is provided between the aerobic upper portion 59 and the anaerobic lower portion 60. The partition wall 11 is of a tapered configuration such that it projects a predetermined length in a generally horizontal direction. The function of the partition wall 11 is to limit the convection of the water being treated between the upper portion 59 and the lower portion 60 thereby to provide for clear separation of the aerobic condition in the upper portion 59 and the anaerobic condition in the lower portion 60 from each other.

The lower portion 60 has granular sludge 12 and a wastewater inlet tube 13. The wastewater inlet tube 13 is connected to the storage tank pump 2 and has a function to discharge the wastewater from the pump 2 into the lower portion 60.

The second bioreactor B2 includes a second reaction/ sprinkling portion (i.e., a second exhaust gas treatment portion) 17 provided in an upper position, a second submerged portion (i.e., a second wastewater treatment portion, or contact/circulation portion) 21 provided in a lower position, and an air lift pump 20A. As is the case with the first bioreactor B1, the second bioreactor B2 includes an exhaust fan 6B for introducing organic matter-containing exhaust gas EG into the space between the second reaction/ sprinkling portion 17 and the submerged portion 21. The second reaction/sprinkling portion 17 has a stack 26B disposed at a topmost location for discharging a treated gas TG.

The second reaction/sprinkling portion 17 has an upper portion in which plastic fillers 5B only are placed on a sprinkling tube 18A, and a lower portion in which plastic filler layers 5B and charcoal layers 4B1 are stacked on a lattice plate 7B in alternate superposed relation.

The second submerged portion 21 contains charcoal 4B2 and calcium carbonate mineral 19A which are enclosed in a net 63A. Layers of charcoal 4B2 and layers of calcium carbonate mineral 19A are alternately stacked. The second submerged portion 21 includes an inclined bottom 21A. A circulating diffuser 64B is disposed above a lowermost surface of the inclined bottom 21A. The circulating diffuser 64B is connected to a circulation blower 22 and has a function of discharging the air from the blower 22 thereby to cause the convection of the water being treated in the second submerged portion 21. Above a surface extending generally horizontally from the lowermost end of the inclined bottom 21A there is disposed a vertically extending air lift pump 20A. The air lift pump 20A extends vertically upward through a ceiling of the second submerged portion 21 until it reaches a location slightly above a generally vertically median site of the second reaction/sprinkling portion 17, and from that location the air lift pump 20A bends horizontally, passing through a side wall of the spray portion 17 to an opposite side wall.

For the charcoal 4B2 as filler material in the second contact/circulation portion 21, "Binchotan" charcoal is chosen which has a specific gravity of more than 1. The "Binchotan" charcoal has an outstanding advantage over other kinds of charcoal in that it sinks when put into water, its body being not liable to breakage when exposed to aeration under vigorous air blow. With ordinary charcoal at large, it is common that the body of the charcoal is subject to partial breakage when exposed to aeration with the result that fractions of the charcoal itself are contained in treated water, which in turn results in an increase in the SS value, an inspection item for quality of discharged water, thus posing an environmental problem. "Binchotan" charcoal has a high volume density and is so hard that it is little liable to breakage or crushing, and can serve for the purpose of continued use for a long period of time, say, more than 5 years, without problem. The inflow load on the second contact/circulation portion 21 may vary depending upon the type and concentration of refractory surfactant, color components, and nitrogen compounds in the water to be treated, and the target quality of treated water. However, when sufficient time is allowed for contact reaction, even trace amounts of surfactant, color components, and nitrogen compounds in the water to be treated can be effectively treated.

Charcoal 4B2 and calcium carbonate mineral 19A are packed in a net 63. The material of the net 63 is not particularly specified if the net 63 can retain the charcoal 4B2 and calcium carbonate mineral 19A therein. Resin materials which are chemically stable against acids and alkalis, such as polyethylene, are acceptable. Naturally, a retainer basket made of stainless steel is also acceptable.

"Binchotan" charcoal specifically selected for the charcoal 4B2 is a charcoal of the kind having a time-honored background of production in Japan, and more specifically it is a white charcoal produced from a kind of broad-leaved tree called "Ubamegashi". As a white charcoal, "Binchotan" charcoal is produced through the process of carbonization at a temperature of about 1000° C. and is ranked as a high-temperature carbonized charcoal. From the standpoint of contact agitation efficiency in the second contact/circulation portion 21, the "Binchotan" charcoal used in the present embodiment is preferably one having a diameter of from 4 cm to 6 cm and a length of 5 cm or more. As long as the "Binchotan" charcoal has a certain dimensional size, there is no possibility of the charcoal being washed away from the tank during the process of aeration, which affords ease of maintenance and management. Since "Binchotan" charcoal has a specific gravity of more than 1 as already mentioned, it settles in water and is little or not liable to breakage due to vigorous aeration. Therefore, "Binchotan" charcoal is much more suitable than other types of charcoal for use as filler for high level treatment of wastewater.

A generally horizontally extending conduit D1 is attached to a topmost portion of the second contact/circulation portion 21. The conduit D1 is connected to the denitrification tank 24.

The denitrification tank 24 is substantially closed against outside air. The denitrification tank 24 includes a vinylidene chloride filler portion 57B. The vinylidene chloride filler portion 57B has a plurality of laterally arranged rows of vinylidene chloride fillers 57, and is connected to two vertically spaced plates. The denitrification tank 24 includes denitrifying bacteria which have been previously supplied thereto. Also, the denitrification tank 24 is loaded with particles of the fine powder material mentioned earlier in a predetermined amount. The denitrification tank 24 also includes a circulating pump 25 disposed adjacent the bottom of the tank at a location below the vinylidene chloride filler portion 57B, the pump 25 being operative to supply treated water upward from its position adjacent the bottom to the top of the filler portion 57B. The denitrification tank 24 has a screen plate (guide wall) 53 for conducting treated water upward from the bottom. This screen plate (guide wall) 53 extends vertically along a side of an interior wall. The treated water rising along the screen plate 53 is introduced into a generally horizontally extending conduit D2 which is connected to the third bioreactor B2.

The third bioreactor B3 includes a third reaction/sprinkling portion (i.e., a third exhaust gas treatment portion) 27 and an hydroponic portion 54, located at an upper position, and a third submerged portion (i.e., a third wastewater treatment portion, or contact/circulation portion) 28, located at a lower position. The third bioreactor B3 also has an air lift pump 20B extending from the third submerged portion 28 to the third reaction/sprinkling portion 27 via the hydroponic portion 54. Further, the third bioreactor B3 has an exhaust fan 6C for introducing organic matter-containing exhaust gas into the space between the third reaction/sprinkling portion 27 and the third submerged portion 28. The hydroponic portion 54, located adjacent the third reaction/sprinkling portion 27, includes a stack 26C for discharging treated gas TG. The stack 26C is located at a topmost position which is most remote horizontally from the spray portion 27. A reference symbol S indicates the sun.

The third reaction/sprinkling portion 27 at the upper side has an upper portion in which plastic fillers 5C are stacked, and a lower portion in which layers of plastic fillers 5C and layers of charcoal 4C are alternately placed one on another. The layers of plastic fillers 5C and layers of charcoal 4C are placed on a lattice plate 7C. Between the upper and lower portions of the third reaction/sprinkling portion 27, there is a water sprinkling tube 18B which extends horizontally across the space between the upper and lower portions. The water sprinkling tube 18B is connected to the hydroponic portion 54. The hydroponic portion 54 includes a bay window-like transparent roof 66 which protrudes slightly upward, the stack 26C located adjacent the transparent roof 66, and a hydroponic device P. The hydroponic device P is adapted to be filled with treated water to a generally vertically central level, with plants 55 being cultivated with the treated water. An upper portion of the hydroponic device P communicates with the topmost portion of the third reaction/sprinkling portion 27 so as to permit exhaust gas to be introduced thereinto from the topmost portion of the spray portion 27.

The third submerged portion 28, located at the lower position in the third bioreactor B3, has layers of charcoal 4C and layers of calcium carbonate mineral 19B which are enclosed in a net 63B. Layers of charcoal 4C and layers of calcium carbonate mineral 19B are alternately placed one on another. The third submerged portion 28 has an inclined bottom 28A. A circulating diffuser 64C is disposed above the lower end of the inclined bottom 28A. The diffuser 64C is connected with the circulating blower 22 and has a function of discharging the air from the blower 22 to thereby move the treated water in the submerged portion 28 by convection. The generally vertically extending air lift pump 20B is located above a lowermost bottom portion continued from the inclined bottom 28A. The air lift pump 20B runs through the ceiling of the third submerged portion 28, then extending obliquely upward until it reaches a maze portion 54a of the hydroponic portion 54. The maze portion 54a extends in adjacent relation to and is linked with the hydroponic device P.

The tank 29 is disposed adjacent the third bioreactor B3. Treated water from the third submerged portion (contact/circulation portion) 28 is introduced into the settling tank 29. The settling tank 29 includes a small pit into which a supernatant liquid in the settling tank 29 is introduced, and a supernatant pump 65 for pumping out supernatant liquid, indicated by SN in the figure, from the small pit. The supernatant liquid SN pumped out by the supernatant pump 65 is returned to the first reaction/sprinkling portion 3 of the first bioreactor B1.

The settling tank 29 includes a scraper 30. Sludge accumulated in a tapered bottom portion of the tank 29 is extracted by a sludge return pump 31 and is introduced into a first return pipe T1 having a valve 62A and into a second return pipe T2 having a valve 62B. The first return pipe T1 is connected with the ceiling of the third reaction/sprinkling portion 27 so as to enable sludge to be sprinkled together with treated water from the ceiling over the third reaction/sprinkling portion 27. The first return pipe T1 has a branch 32A which is connected through a valve 62C to the ceiling of the first reaction/sprinkling portion 3 of the first bioreactor B1. The branch 32A sprinkles sludge together with treated water from the ceiling over the first reaction/sprinkling portion 3. The second return pipe T2 is connected to the conduit D1 which interconnects the second bioreactor B2 and the denitrification tank 24.

According to the above described arrangement of the first embodiment, the developer-containing wastewater, an object of treatment, is first introduced into the storage tank 1. A mixture liquid from the alcohol/membrane-concentrated-liquid mixing tank 14 is also introduced into the storage tank 1. The wastewater and the mixture liquid which have been received in the storage tank 1 are agitated by the agitator 36, and the resulting mixture is extracted by the storage tank pump 2 and sent to the wastewater inlet tube 13 at the bottom of the first submerged portion W1 of the first bioreactor B1.

The wastewater inlet tube 13 has small holes of equal size formed on the upper side thereof such that, through discharge of wastewater from the small holes, uniform quantities of wastewater can be discharged upward from the bottom of the first submerged portion W1. The concentration of microorganisms in the upper portion 59 of the first submerged portion W1 is preferably controlled to more than 15,000 ppm in terms of MLSS, which the concentration of microorganisms in the lower portion 60 of the first submerged portion W1 is preferably controlled to more than 40,000 ppm in term of MLSS. Controlling of the concentration of microorganisms in the lower portion 60 to be exceptionally high allows granular sludge 12 to be formed through autogranulation largely through the action of anaerobic bacteria in the lower portion 60. Through the utilization of such granular sludge 12 it is possible that developer-containing wastewater having a high-concentration content of organic matter is effectively treated without dilution.

Only when the concentration of microorganisms in the lower portion 60 of the submerged portion W1 of the first bioreactor B1 is controlled to a level of more than 40,000 ppm of MLSS as stated above, the formation of granular sludge 12 can be accomplished. Generally, a considerable time period is required in forming such granular sludge 12 by autogranulation mainly through the action of anaerobic bacteria. However, because of the fact that in addition to developer-containing wastewater, alcohol, membrane concentrated liquid to be described hereinafter, biofilm sludge to be described hereinafter, and fine powder 58 are also introduced from the storage tank 1 into the lower portion 60, granular sludge 12 can be formed in a shorter time.

The fine powder 58 is initially loaded into the denitrification tank 24 to an excessive amount. Then, particles of the fine powder 58 are passed through the third submerged portion 28 for entry into the settling tank 29 in which the particles are settled. Settled particles and sludge are sucked into the sludge return pump 31 for being sprinkled over the top of the first reaction/sprinkling portion 3 of the first bioreactor B1. Thus, the particles of the fine powder 58 are passed through the first reaction/sprinkling portion 3 and further the upper portion 59 of the first submerged portion W1. Then, due to an overflow, the particles are allowed to enter into the alcohol/membrane-concentrated-liquid mixing tank 14 from which they are returned to the storage tank 1. The fine powder 58 which has thus entered into the storage tank 1 is sufficiently mixed with a small amount of biofilm sludge, developer-containing wastewater, alcohol and membrane concentrated liquid, through the agitation by the agitator 36. The resulting mixture is introduced by the storage tank pump 2 into the lower portion 60 of the first submerged portion W1 through the wastewater inlet tube 13, as earlier stated. Then, as already described, with the lapse of time, granular sludge 12 is formed which is autogranulated largely through the action of alcohol-originated anaerobic bacterial. After granular sludge 12 has been sufficiently formed, biofilm sludge and fine powder 58, which serve as the nuclei of granular sludge 12, are no longer required; and therefore sludge return to the first bioreactor B1 by the sludge return pump 31 is stopped. It is noted, however, that exhaust gas cleaning water is required for the first reaction/sprinkling portion 3. For this purpose, the supernatant pump 65 is operated for supply of a supernatant liquid to enable washing of charcoal 4A and plastic fillers 5A.

Treated water from the upper portion 59 of the first submerged portion W1 of the first bioreactor B1 is passed through the membrane filter 9 which is disposed on the suction side of the lift pump 8, and the filtrate is introduced into the second contact/circulation portion 21 of the second bioreactor B2.

The partition wall 11 serves to separate the upper portion 59 (aerobic porion) of the first submerged portion W1 from the lower portion 60 (anaerobic portion) of the first submerged portion W1. The presence of the partition wall 11 prevents the lower portion 60 from being affected by the circulation water current in the upper portion 59. Since the circulation water current in the upper portion 59 is a turbid current having a high microbial concentration, a partition wall 11 of a protrudent configuration as in this first embodiment can effectively fulfill the function required of it. More specifically, where dimensions of the first submerged portion W1 are 1 meter in width, 2 meters in depth, and about 2 meters in height, the quantity of protrusion of the partition wall 11 to the inside of the tank should be of the order of 10 cm, whereby the partition wall 11 can perform the required separating function. That is, the quantity of protrusion of the first submerged portion W1 may be of the order of 5 to 10% of the width or depth dimension of the submerged portion W1, although specific values of the protrusion vary depending on the size of the first submerged portion W1.

The dissolved oxygen meter 16 in the upper portion 59 of the first submerged portion W1 is operative to measure the dissolved oxygen in the upper portion 59 which contains microorganisms at a high concentration, whereby details of operation of the membrane filter cleaning blower 23 are controlled so as to enable the interior of the upper portion 59 to be constantly maintained in aerobic conditions.

Nutrients including phosphorus, such as phosphoric acid, stored in the nutriment tank 34, are supplied into the upper portion 59 of the first submerged portion W1 through the nutriment pump 35. The nutrients including phosphoric acid facilitate normal growth of aerobic and anaerobic bacteria within the first submerged portion W1 and also assist in the maintenance of microbial precipitation. The amount of addition of total phosphorus is of the order of 20% relative to influent total nitrogen, which may be taken as a standard. This value is an empirical value obtained in microbial treatment.

Figure 4B:
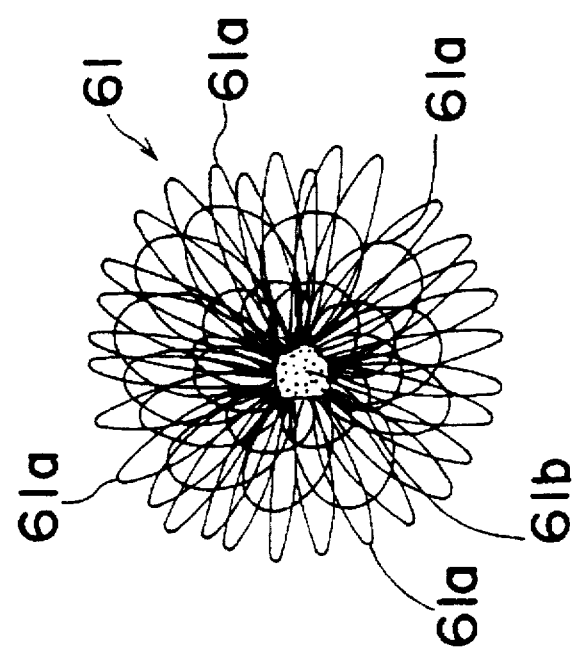
FIG. 4B is a structural diagram showing a portion of the vinylidene chloride filler as viewed from above.
Figure 4A:
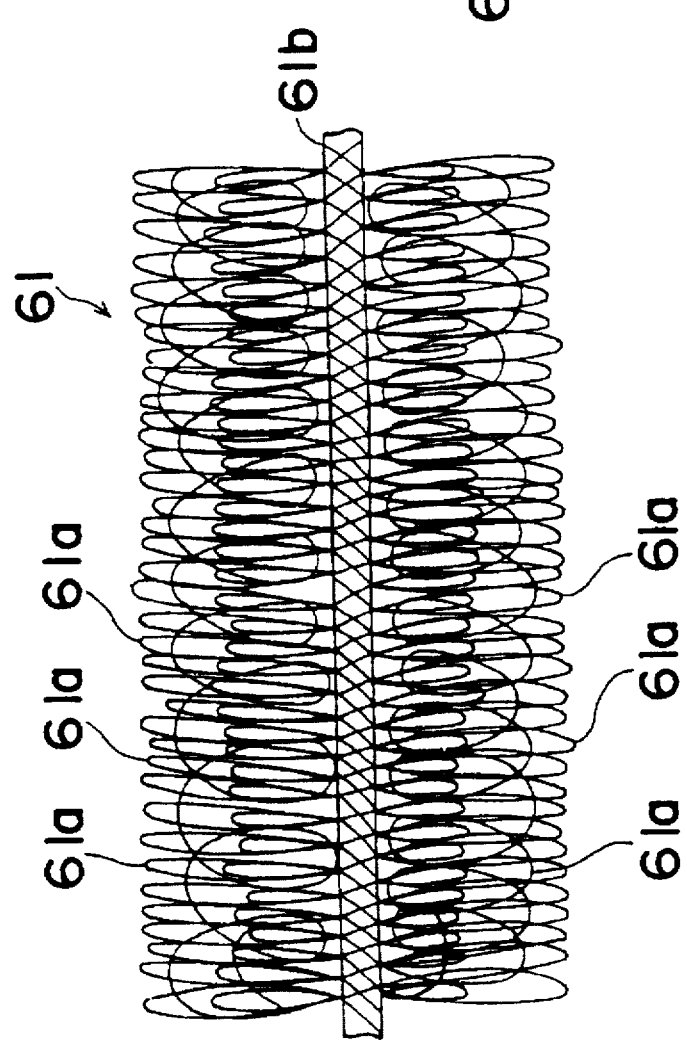
FIG. 4A is a structural diagram showing a portion of the vinylidene chloride filler (a radially spread ring-shaped thready body) used in each of the first and second embodiments as viewed from one side.

With the lapse of operation time, various types of sludge composed of various kinds of microorganisms are deposited and grown on the vinylidene chloride fillers 57 arranged below the membrane filter 9 in the upper portion 59 of the first submerged portion W1. The material of the vinylidene chloride fillers 57 is vinylidene chloride. The configuration of the vinylidene chloride filler 57 is shown with respect to one part 61 thereof in FIGS. 4A and 4B. As FIGS. 4A and 4B illustrate, the vinylidene chloride filler 57 is a radially extending ring-shaped thready body. As obvious from FIGS. 4A and 4B, the vinylidene chloride filler 57 has a core comprised of a cord-like thread member 61b which is knitted from a thick yarn. From the thread member 61b there extend a plurality of ring-shaped portions 61a in a radial fashion. The thick yarn is formed with a plurality of fine holes to provide a structure ready to facilitate the growth of microorganisms. The vinylidene chloride filler 57 is comprised of fine fibers so that it provides a large surface area convenient for the deposition and growth of microorganisms. Common activated sludges also deposit on the vinylidene chloride filler 57 easily. As more sludge deposits on the vinylidene chloride filler 57 which is a radially extending ring-shaped thread body as stated above, dissolved oxygen supply becomes less available to the cord-like thread member 61b, and this leads to the creation of an anaerobic condition. Therefore, the vinylidene chloride fillers 57 facilitate growth of anaerobic bacteria which treat organic matter and nitrate nitrogen. That is, the more sludge deposition on the vinylidene chloride fillers 57, the higher the concentration of anaerobic bacteria in the vinylidene chloride filler 57, so that conditions better suited for anaerobic treatment can be obtained.

The operation time per-day for the sludge separating blower 69 connected to the sludge separating diffuser 68 is set at 20 minutes on the basis of 2 cycles of operation per day, each cycle being 10 minutes. Microbial sludge containing microorganisms deposited and grown on the vinylidene chloride fillers 57 is periodically separated therefrom by the air discharged from the sludge separating diffuser 68. That is, by subjecting the vinylidene chloride filler portion 57A to aeration by the sludge separating diffuser 68 twice a day, flocs of aerobic bacteria deposited at a high concentration on the surface of the vinylidene chloride fillers 57, as well as flocs of anaerobic bacteria grown in the interior of the vinylidene chloride fillers 57 are separated from the vinylidene chloride fillers 57. Further, by such aeration it is intended that flocs of anaerobic bacteria in the interior of the vinylidene chloride fillers 57 are separated and comminuted so that microfine anaerobic bacteria are drawn out from the interior, and that the drawn-out microfine bacteria are more effectively utilized for purposes of denitrification treatment.

When flocs of microorganisms deposited on the vinylidene chloride fillers 57 are separated therefrom and comminuted by aeration, there occurs a rapid increase in the concentration of microorganisms in the upper portion 59 of the first submerged portion W1. The microorganisms which are thus increased in concentration include not only aerobic bacteria, but also anaerobic bacteria. Therefore, not only organic matter treatment but also nitrate nitrogen treatment (denitrification) can be effected by microbial mixtures of various kinds of aerobic and anaerobic bacteria contained in fluidic areas of the upper portion 59.

The water under treatment in the first submerged portion W1 is introduced from the upper portion 59 into the alcohol/membrane-concentrated-liquid mixing tank 14, then from the tank 14 into the storage tank 1, and subsequently into the lower portion 60 for a repetitive cycle of circulation. Therefore, even when the nitrate nitrogen in the water under treatment is not completely eliminated in one cycle of circulation, the nitrate nitrogen can be eliminated in the course of water circulation through repetitions of the circulation cycle.

The circulating diffuser 64A is a circulating diffuser for the aerobic upper portion 59 of the first submerged portion W1. This circulating diffuser 64A discharges the air supplied from the membrane cleaning blower 23. As already stated, the membrane cleaning blower 23 is controlled by a signal output by the dissolved oxygen meter 16 disposed in the aerobic upper portion 59.

Organic matter-containing exhaust gas EG is taken in by the exhaust fan 6A and enter into the first reaction/sprinkling portion 3 from below. Likewise, offensive odor gas generated in the first submerged portion W1 itself is also allowed to enter the first reaction/sprinkling portion 3 from below.

Considering from the view point of exhaust gas treatment, there are two kinds of gases to be treated, namely, the organic matter-containing gas and the offensive odor gas generated in the first submerged portion W1 itself. In this first embodiment, operation of the apparatus is carried out under conditions of high microbial concentration such that the concentration of microorganisms in the upper portion 59 of the first submerged portion W1 is of the order of more than 15,000 ppm in terms of MLSS. As a result, offensive odor gas generates from the upper portion 59 to a certain degree. However, the quantity of generation of such offensive odor gas is smaller than that from any conventional anaerobic tank and, in addition, since the upper portion 59 of the first submerged portion W1 is constantly kept in aerobic condition, the odor from the upper portion 59 is not of such a high concentration as that from conventional anaerobic tank. Although anaerobic bacteria are utilized in the first submerged portion W1, the upper portion 59 is constantly kept aerobic. Therefore, the problem of odor with the present embodiment is considerably smaller than that with the prior art.

The aforesaid two kinds of gases to be treated, namely, organic matter-containing exhaust gas originating from the production facility, and offensive odor gas from the upper portion 59 of the first submerged portion W1, are introduced into the first reaction/sprinkling portion 3. The organic matter-containing exhaust gas originating in the production facility contains organic solvents, such as IPA, which are used in the production processes.

In this first embodiment, three exhaust fans 6A, 6B and 6C are provided respectively for the first reaction/sprinkling portion 3 of the first bioreactor B1, the second reaction/sprinkling portion 17 of the second bioreactor B2, and the third reaction/sprinkling portion 27 of the third bioreactor B3, so that they are employed at three locations for parallel treatment of exhaust gas. Through this arrangement, the treating capacity for organic matter-containing exhaust gas can be enhanced.

At respective topmost sites of the first reaction/sprinkling portion 3, second reaction/sprinkling portion 17, and third reaction/sprinkling portion 27, return sludge containing biofilm sludge and fine powder 58 from the sludge return pump 31 is sprinkled over the reaction/sprinkling portions 3, 17, 27. The biofilm sludge referred to above means the biofilm sludge separated from the third contact/circulation portion 28. The biofilm-containing sludge from the sludge return pump 31 is sprinkled onto respective sets of charcoal 4A, 4B1, 4C and plastic fillers 5A, 5B, 5C of the first reaction/sprinkling portion 3, second reaction/sprinkling portion 17, and third reaction/sprinkling portion 27. This ensures more positive formation of biofilms on those fillers (charcoal 4A, 4B1, 4C and plastic fillers 5A, 5B, 5C), so that the exhaust gas is biologically treated also by such biofilms. In this way, the exhaust gas is rationally treated by the return sludge.

The charcoal 4A placed in the first reaction/sprinkling portion 3 has some adsorptivity, though not as high as that of activated carbon, and does adsorb organic matter contained in the exhaust gas. Organic matter thus adsorbed are biologically treated by microorganisms grown in the interior of the charcoal 4A. For the charcoal 4A, black charcoal having good adsorptivity is preferred though this is not an essential condition.

Figure 6:
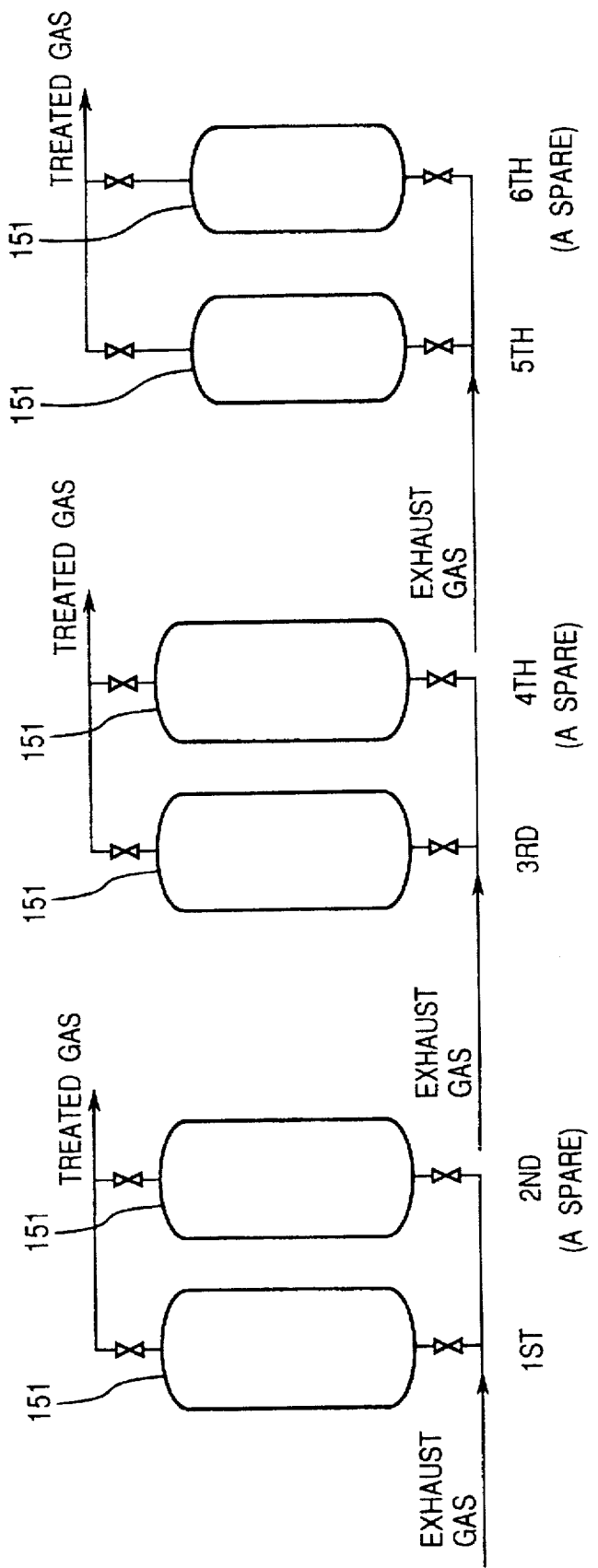
FIG. 6 is a diagram showing activated carbon adsorption towers of a conventional apparatus for treatment of organic substance-containing exhaust gases which has an exhaust gas treating capability of substantially the same level as that of the first embodiment.
Figure 7:
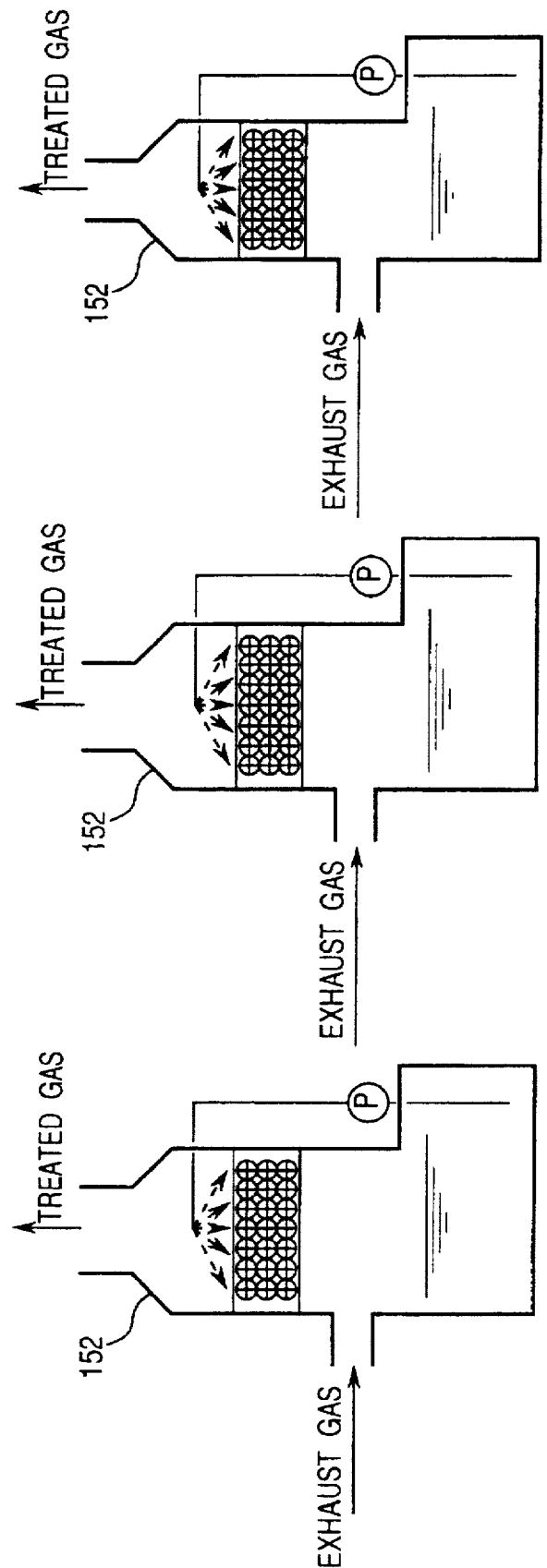
FIG. 7 is a diagram showing acid scrubbers of a conventional acid-containing exhaust gas treating apparatus which has an exhaust gas treating capability of substantially the same level as that of the first embodiment.

As already noted, generally a conventional organic matter-containing exhaust gas treatment apparatus includes a large number (e.g., six) of activated carbon adsorption towers 151 as shown in FIG. 6. In this prior art arrangement, it is necessary that after adsorption of organic matter in the activated carbon adsorption towers 151, the organic matter so adsorbed be separated by steam from the activated carbon before treatment. Conventionally, repetitive steps of such adsorption and separation are required and, therefore, it has been essential that two activated carbon adsorption towers 151 be installed for one unit in order to enable continuous treatment of exhaust gas. In contrast, the present embodiment enables the exhaust gas treatment in the first reaction/sprinkling portion 3 in such a way that after organic matter adsorption, the organic matter are biologically treated by microorganisms grown on the charcoal 4A and plastic fillers 5A. According to the present embodiment, therefore, exhaust gas treatment can be performed with much higher efficiency than in the prior art.

The water treated in the first bioreactor B1 is then introduced into the second contact/circulation portion 21 of the second bioreactor B2 via the lift pump 8. In the second contact/circulation portion 21, layers of charcoal 4B2 and layers of calcium carbonate mineral 19A, both as fillers, are stacked one on another in an alternate fashion. Biofilm sludge separated from the fillers and precipitated moves downward along the inclined bottom 21A until it reaches a position right under a suction port of the air lift pump 20A. Since a circulating water current is present in the second contact/circulation portion 21, the angle of inclination of the bottom 21A may be of the order of 10°. This inclination angle of 10° may also be applicable to the inclination angle of the bottom 28A of the third contact/circulation portion 28°. Air for the air lift pump 20A is supplied from the blower 33.

"Binchotan" charcoal, as a typical example of charcoal 4B2, and oyster shell and "Kansuiseki" stone, as typical examples of calcium carbonate mineral 19A, are all natural materials and, therefore, they provide more favorable conditions for microbial attachment and growth as compared with artificial fillers, such as vinyl chloride and plastic fillers. The reason for choice of the "Binchotan" charcoal as a typical example of charcoal 4B2 used as a filler material for the second contact/circulation portion 21 is that the "Binchotan" charcoal has a specific gravity of more than 1 and sinks in water.

The volume of air to be discharged from the circulating diffuser 64B in the second contact/circulation portion 21, and from the circulating diffuser 64C in the contact/ circulation portion 28 may be set within the range of from 60 to 80 m³/m³ of tank/day. Biofilms formed on the surfaces of fillers, i.e., charcoal 4B2 and calcium carbonate mineral 19A, in the second contact/circulation portion 21 are separated from the fillers by the air discharged from the circulating diffuser 64, being thus allowed to become biofilm sludge. In this case, if the circulating blower 22 is inverter-controlled to provide a larger volume of air blow than that during normal operation, biofilms are more effectively separated from the fillers.

Next, circulated water that contains biofilm sludge at the bottom of the second contact/circulation portion 21 is pumped up by the air lift pump 20A and is sprinkled from the sprinkling tube 18A on the second reaction/sprinkling portion 17. In this conjunction, biofilm sludge originating from separated biofilms is sprinkled from the sprinkling tube 18A, with the result that some biofilm sludge deposits on the charcoal 4B1 and the plastic fillers 5B and grows thereon. Biofilm sludge thus grown acts to microbially treat organic matter-containing exhaust gas EG introduced from the exhaust fan 6B. The exhaust gas goes in contact with the biofilms grown on the surfaces of the fillers 4B1 and 5B and is biologically treated. At the same time, the exhaust gas is adsorbed by the charcoal fillers 4B1 to undergo adsorption treatment. As a result of the sprinkling operation, a part of the biofilm sludge, while being sufficiently supplied with oxygen, moves downward until it returns to the second contact/circulation portion 21 in which it is utilized for treatment of the water to be treated. In the second contact/ circulation portion 21 there is created an ascending water current due to the air discharged from the circulating diffuser 64B, and the tank interior is constantly agitated moderately by the ascending water current. A developer-containing wastewater contains a resist ingredient and, therefore, has a chromaticity of the order of 4,000°. In the second contact/ circulation portion 21, as the first step of treatment, color ingredients in the wastewater are adsorbed by charcoal B2. The charcoal 4B2 has various kinds of microorganisms grown therein. After having adsorbed the color ingredients, the charcoal 4B2 acts to biologically treat the color ingredients by means of the microorganisms. The charcoal 4B2 performs physical adsorption treatment first, and then performs microbial treatment; therefore, it can be called "bio-active charcoal". On the other hand, the calcium carbonate mineral 19A acts to biologically oxidize nitrogen compounds in the water under treatment to cause nitrite nitrogen and/or nitrate nitrogen to be produced. Through this action, the calcium carbonate mineral 19A performs a neutralizing function such that pH of the water under treatment is prevented from being inclined toward the acid side.

Next, the water under treatment flows from the second contact/circulation portion 21 into the duct D1. From the duct D1 the water under treatment is introduced into the denitrification tank 24 on a gravity flow basis. In the denitrification tank 24, the water under treatment is treated in such a way that nitrate nitrogen is mainly reduced to nitrogen gas, whereby the water under treatment is denitrified.

The denitrification tank 24 incorporates vinylidene chloride fillers 57. Vinylidene chloride fillers 57 are distributed as uniformly as possible throughout the whole of the denitrification tank 24. As a result, denitrifying bacteria can be retained in high concentration within the denitrification tank 24. After placement of vinylidene chloride fillers 57 in the denitrification tank 24, fine powder 58 is loaded into the tank 24 in the proportion of about 5% of the tank capacity so that fine powder 58 will attach to all of the vinylidene chloride fillers 57. The fine powder 58 has a large surface area and, therefore, denitrifying bacteria are stably immobilized to the fine powder 58. The fine powder 58 is prone to deposit on the vinylidene chloride fillers 57, and this enables the denitrifying bacteria to be maintained in high concentration throughout the denitrification tank 24. Even in case where the denitrification tank 24 has vinylidene chloride fillers 57B alone and no fine powder 58, denitrifying bacteria can be immobilized to the vinylidene chloride fillers 57 to a certain extent.

As described earlier, the vinylidene chloride filler 57 is made of vinylidene chloride and has a radially extending ring-shaped thready structure. Since the vinylidene chloride filler 57 is formed of fine fibers, it has a large surface area which provides favorable conditions for lodging and growth of microbial sludge, such as ordinary activated sludge. However, denitrifying bacteria are very minute and their microbial layer is very thin, so that they can hardly exist in the form of such pulpy sludge as common activated sludge. Therefore, it is designed that denitrifying bacteria are introduced along with fine powder material into the vinylidene chloride fillers 57 so as to be stably immobilized to the vinylidene chloride fillers 57. In other words, the fine powder material has a function to serve as an immobilizing carrier for denitrifying bacteria. As more fine-powder material attaches the vinylidene chloride fillers 57, less dissolved oxygen will penetrate into the interior of the cord-like thread member 61b (see FIGS. 4A and 4B), with the result that the interior of the cord-like thread member 61b becomes completely anaerobic. Thus, denitrifying bacteria for treating nitrate nitrogen will more effectively propagate in the interior of the thread member 61b. Accordingly, the more fine-powder material 58 attaches to the radiate, ring-shaped thready body, the higher is the microbial concentration of the denitrifier bacteria.

The circulating pump 25 disposed in the denitrification tank 24 has a function to circulate the water being treated in the tank. A conventional agitator or a submerged agitator can be employed in place of the circulating pump 25. It is only required in the above connection that the water being treated within the tank be brought in sufficient contact with the denitrifying bacteria immobilized to the fine powder 58. The denitrification tank 24 is a closed tank in construction, with the exception of portions of inflow piping and discharge piping (conduit D1). The reason is that if the denitrification tank 24 is an open tank, oxygen in the air will be dissolved into the tank, with the result that the process of reduction is prevented which should occur in the absence of oxygen. Alcohol, as a hydrogen donor, is added (not shown) into the denitrification tank 24. For the alcohol it is common to use methanol (methyl alcohol), but waste IPA, a waste material generated at semiconductor and/or liquid crystal plants, can be used without involving any problem. In the present embodiment, waste IPA is utilized as such. A standard amount of addition of the alcohol may be about three times the total nitrogen in the water under treatment which flows into the denitrification tank 24, though this is not an absolute condition. Therefore, an optimum amount of addition may be determined by experiments, including the quality of waste IPA. The water under treatment, as denitrified in the denitrification tank 24, has been loaded with the alcohol as a hydrogen donor, which has resulted in an increase in the COD value.

Next, the treated water from the denitrification tank 24 is introduced into the contact/circulation portion 28 of the third bioreactor B3 through the duct D2. The purpose of the third bioreactor B3 is to effectively reduce the COD (Chemical Oxygen Demand) value which has increased as a result of the alcohol addition in the denitrification tank 24, and also to perform a more positive and reliable treatment of color components. That is, the purpose is to carry out, through a combined operation of the third contact/circulation portion 28 and the third reaction/sprinkling portion 27, treatment of excess alcohol (i.e., treatment of the COD) resulting from alcohol addition in the denitrification tank 24, and adsorption of color components and post-adsorption microbial treatment of color components.

The circulated water from the third contact/circulation portion 28 is sprinkled by the air lift pump 20B through the sprinkling tube 18B over the third reaction/sprinkling portion 27 above the contact/circulation portion 28. The third reaction/sprinkling portion 28 has charcoal 4C and plastic fillers 5C packed therein. As the water under treatment circulates, and with the lapse of time, biofilms are formed on the charcoal 4C and plastic fillers 5C. The biofilms exhibit good performance in the treatment of wastewater and exhaust gas.

For calcium carbonate fillers 19A, 19B in the second and contact/circulation portions 21, 28, oyster shell is selected. Alternatively, coral, "Kansuiseki", or marble can be used. However, oyster shell is most economical. For oyster shell selection, it is important that the oyster shell has been left on land for about 12 months and is odor-free. The surface of oyster shell permits ready growth thereon of microorganisms and formation of biofilms. Therefore, while the water under treatment is in the process of circulating in the contact/circulation portion 28 with the aid of the circulating diffuser 64C, the water under treatment is biologically filtered by the biofilms on the surface of the oyster shell. Therefore, according to the present embodiment, the FIG. 5 rapid filtration towers 109 which have been required in the prior art are no longer necessary. This results in a decrease in the number of tanks.

Exhaust gas EG is introduced by the exhaust fan 6C into the third reaction/sprinkling portion 27 from below. The exhaust gas is biologically treated by biofilms in the third reaction/sprinkling portion 27, and is physically treated through adsorption by charcoal 4C.

Further, the water under treatment from the third contact/circulation portion 28 is lifted by the air lift pump 20B to be introduced into the hydroponic portion 54 which is adjacent to the third reaction/sprinkling portion 27, before it is introduced into the spray portion 27. In the hydroponic portion 54, there are grown plants 55, such as evergreen plants which are suitable for hydroponics and which will not die throughout all seasons. The begonia, known as an ornamental plant, is exemplary of such plants. Roots 55B of the begonia grow by ingesting a trace amount of mineral eluted from the charcoal and calcium carbonate mineral, and also nitrogen compounds, such as nitrate nitrogen. This means that the water under treatment which is introduced into the hydroponic portion 54 undergoes a high level treatment by the plants 55 with respect to its nitrogenous compound content. On the other hand, treated gas from the third reaction/sprinkling portion 27 is introduced into a greenhouse portion 56, an upper portion of the hydroponic portion 54. The treated gas retains a heat sufficient to keep warm the interior of the greenhouse portion 56 and maintain the temperature therein in a range of from 17° C. to 27° C. This enables the plants 55 to grow throughout the year. In the event that there occurs any continued abnormality in the concentration of treated gas from the third reaction/sprinkling portion 27, green leaves 55A of the plants will have a change in the color. Thus, it is possible to monitor the condition of treated gas by observing the condition of the plants 55. For the plant 55, vegetables or trees other than the begonia may also be selectable. Any type of plant is usable provided the plant is suitable for hydroponics and its leaves permits monitoring of treated gas.

The circulating diffuser 64C disposed at the bottom of the contact/circulation portion 28 controls, to high/low level, the volume of air discharged from the circulating diffuser 64 so as to separate biofilms from the fillers 4C and 19B. Specifically, the volume of air discharge can be adjusted through inverter control of the circulating diffuser 22. Separated biofilms descend along the downwardly sloped bottom 28A and toward the air lift pump 20 by which they are readily introduced into the third reaction/sprinkling portion. The angle of inclination of the bottom 28A may be 10° as in the case of the second contact/circulation portion 21.

Next, the water under treatment which has been sterically treated by the contact/circulation portion 28 and third reaction/sprinkling portion 27 in the third bioreactor B3 is introduced into the settling tank 29, In the settling tank 29, solids such as biofilm sludge and fine powder material 59 which are contained in the water are precipitated, so that the water under treatment is thus separated into solid and liquid.

The scraper 30 provided in the settling tank 29 collects precipitates and directs them to the lowermost location, at which the precipitates are sucked into the sludge return pump 31. The precipitates (microbial sludge and fine powder precipitated in the settling tank 29) sucked by the sludge return pump 31 are transported through the first return pipe T1 to the ceiling of the third reaction/sprinkling portion 27 and are sprinkled from that location into the interior of the spray portion 27. Also, precipitates conveyed through the pipe 32A branched from the first return pipe T1 are sprinkled from respective ceilings of the first and second reaction/sprinkling portion 3, 17 into the interior of the reaction/sprinkling portions 3, 17. Also, precipitates, introduced into the duct D1 through the second return pipe T2, are conducted to the denitrification tank 24.

In this way, quantities of the return sludge and fine powder 58 sucked into the sludge return pump 31 are returned to the first reaction/sprinkling portion 3, the second reaction/sprinkling portion 17, the third reaction/sprinkling portion 27, and the denitrification tank 24 so that they are utilized in exhaust gas treatment and also in denitrification treatment. Items so returned are supplied with oxygen in respective reaction/sprinkling portion 3, 17, 27, and are then returned to the submerged portion W1 and the contact/circulation portions 21, 28 for being recycled in wastewater treatment.

In this way, the original developer-containing wastewater undergoes broadly classified four separate stages of treatment (i.e., treatment by the first bioreactor B1, treatment by the second bioreactor B2, treatment by the denitrification tank 24, and treatment by the third bioreactor B3) during its travel from the storage tank 1 to the settling tank 29. Therefore, the quantity of biofilm sludge precipitated in the settling tank 29 is exceptionally small. Therefore, it is necessary to effectively utilize the fine powder material introduced into the denitrification tank 24.

The precipitate includes a small quantity of biofilm sludge and a larger part of the fine powder 58. Quantities of such precipitate are introduced through the sludge return pump 31 into the first reaction/sprinkling portion 3, the second reaction/sprinkling portion 17, the third reaction/sprinkling portion 27, and the denitrification tank 24. The quantity of precipitate to be introduced into the first reaction/sprinkling portion 3, the quantity of precipitate to be introduced into the second reaction/sprinkling portion 17, the quantity of precipitate to be introduced into the third reaction/sprinkling portion 27 are determined according to the quantity of organic matter-containing exhaust gas and the concentration of the exhaust gas in the respective reaction/sprinkling portions.

The biofilm sludge and fine powder 58 that have been biologically treated in wastewater exhibit not only a biological reaction, but also a physical organic matter adsorption effect with respect to organic matter in exhaust gas. Then, the biofilm sludge and the fine powder 58 fall into the second and third contact/circulation portions and are treated by microorganisms in the wastewater during circulation. On the other hand, the biofilm sludge and the fine powder 58 which are introduced into the first reaction/sprinkling portion 3 adsorb organic matter in wastewater, and are caused to fall down into the first submerged portion W1 by the water sprinkle. The adsorbed organic substances are treated by aerobic organisms in the upper portion 59. Biofilm sludge and fine powder 58 that have been filtered by the membrane filter 9 in the upper portion 59 of the first submerged portion W1 are identified as membrane concentrated liquid and are introduced through an overflow into the alcohol/membrane-concentrated-liquid mixing tank 14. Aerobic bacteria which have grown on the biofilm sludge and fine powder 58 are killed through the bactericidal action of the alcohol. Thus, it is now possible to advance the start of the subsequent creation of anaerobic bacteria. Note that among various kinds of alcohols, methanol and ethanol have a comparatively high sterilizing effect. Thereafter, the biofilm sludge and the fine powder 58 are introduced into the storage tank 1. Then, they flow into the lower portion 60 of the first submerged portion W1 of the first bioreactor B1 so that they serve as nuclei of granular sludges dominated by anaerobic bacteria.

Particle size of the fine powder 58 should be 1 mm or less. If the particle size of the fine powder 58 is too large, the powder material can easily settle, so that attachment of the powder to the vinylidene chloride fillers 57B is made difficult.

The quantity of input of biofilm sludge and fine powder 58 into the denitrification tank 24 is set relatively small, because supply of these items are not necessary at all times. For this reason, a return pipe T2 and a pipe 32B for supply to the denitrification tank 24 is provided separately from the return pipe T1 and its branch pipe 32A for supply to the individual reaction/sprinkling portions for the purpose of the exhaust gas treatment Therefore, when some decrease occurs with respect to the quantity of the fine powder 58 immobilized to the vinylidene chloride fillers 57 in the denitrification tank 24, the valve 62B should be opened for return feed through the pipes T2, 32B. In this case, a small amount of biofilm sludge is also returned simultaneously. As a result, denitrifying bacteria are also immobilized to the biofilm sludge as well, and the biofilm sludge to which the denitrifying bacteria are immobilized will become attached to the vinylidene chloride fillers 57. Strictly speaking, in the denitrification tank 24, denitrifying bacteria are immobilized to a small amount of biofilm sludge and to a larger proportion of the fine powder 58.

Second Embodiment

Next, a second embodiment of the wastewater treatment apparatus of the invention will be explained with reference to FIG. 2. This second embodiment is different from the first embodiment shown in FIG. 1 only in that it includes a submerged portion W1Z, as shown in FIG. 2, in place of the submerged portion W1 of the first bioreactor B1 in the first embodiment. With respect to the second embodiment, therefore, description will be made mainly of the point in which the second embodiment is different from the first embodiment.

An upper portion 59Z of the submerged portion W1Z in the second embodiment is narrower in space than the submerged portion W1 in the first embodiment, and has no vinylidene chloride filler portion 57A. Instead, the submerged portion W1Z in the second embodiment has a lower portion 60G which is wider in space than the lower portion 60 in the first embodiment, so that the lower portion 60G contains a larger amount of granular sludge 12Z than the lower portion 60. Therefore, according to this second embodiment, by using a larger amount of granular sludge 12Z, organic matter in wastewater can be digested in a more positive manner than in the case of the first embodiment.

According to the arrangement of the second embodiment shown in FIG. 2, a larger quantity of granular sludge can be utilized, because the first bioreactor B1 of the second embodiment is not loaded with the vinylidene chloride fillers. Therefore, even when the total nitrogen concentration of the developer-containing wastewater is more than 600 ppm, it is possible to reduce the total nitrogen concentration in final treated water to a level of less than 20 ppm. Also, in case where the chromaticity of developer-containing wastewater is more than 4,000°, the chromaticity can be reduced to less than 5°. In this second embodiment, the capacity of the upper portion (aerobic portion) 59Z in the first bioreactor B1 is smaller than that in the first embodiment of FIG. 1, and this upper portion 59Z is not packed with the vinylidene chloride fillers. In these points, the second embodiment is different from the first embodiment. In other words, in the second embodiment, emphasis is placed on digestive treatment of organic matter through anaerobic treatment in the first bioreactor B1, whereas in the first embodiment, emphasis is placed on aerobic treatment in the first bioreactor B1, wherein nitrogen compounds are aerobically oxidized into nitrate nitrogen.

Third Embodiment

Figure 2:
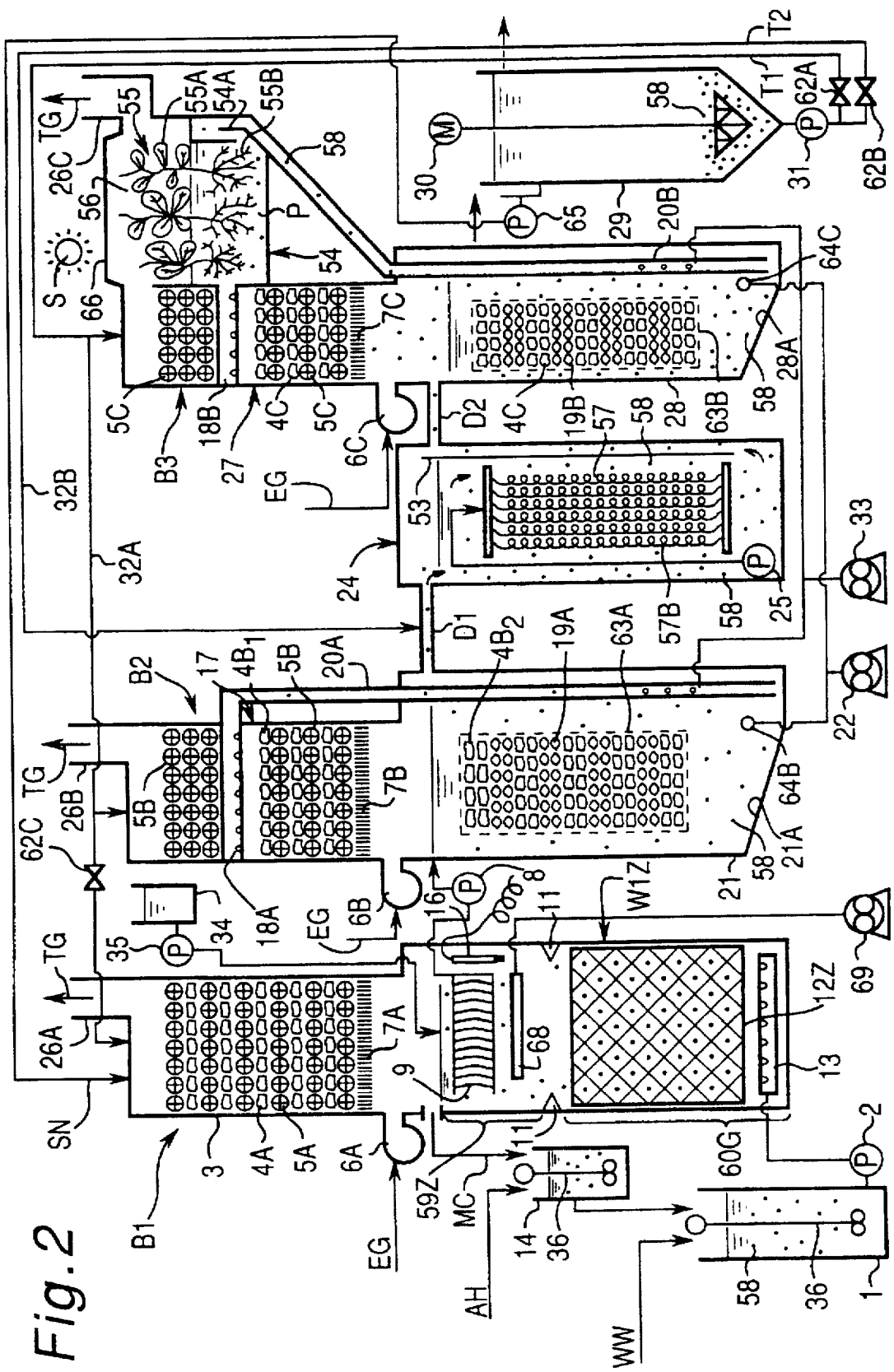
FIG. 2 is a schematic diagram showing a second embodiment of the wastewater treatment apparatus of the invention.
Figure 3:
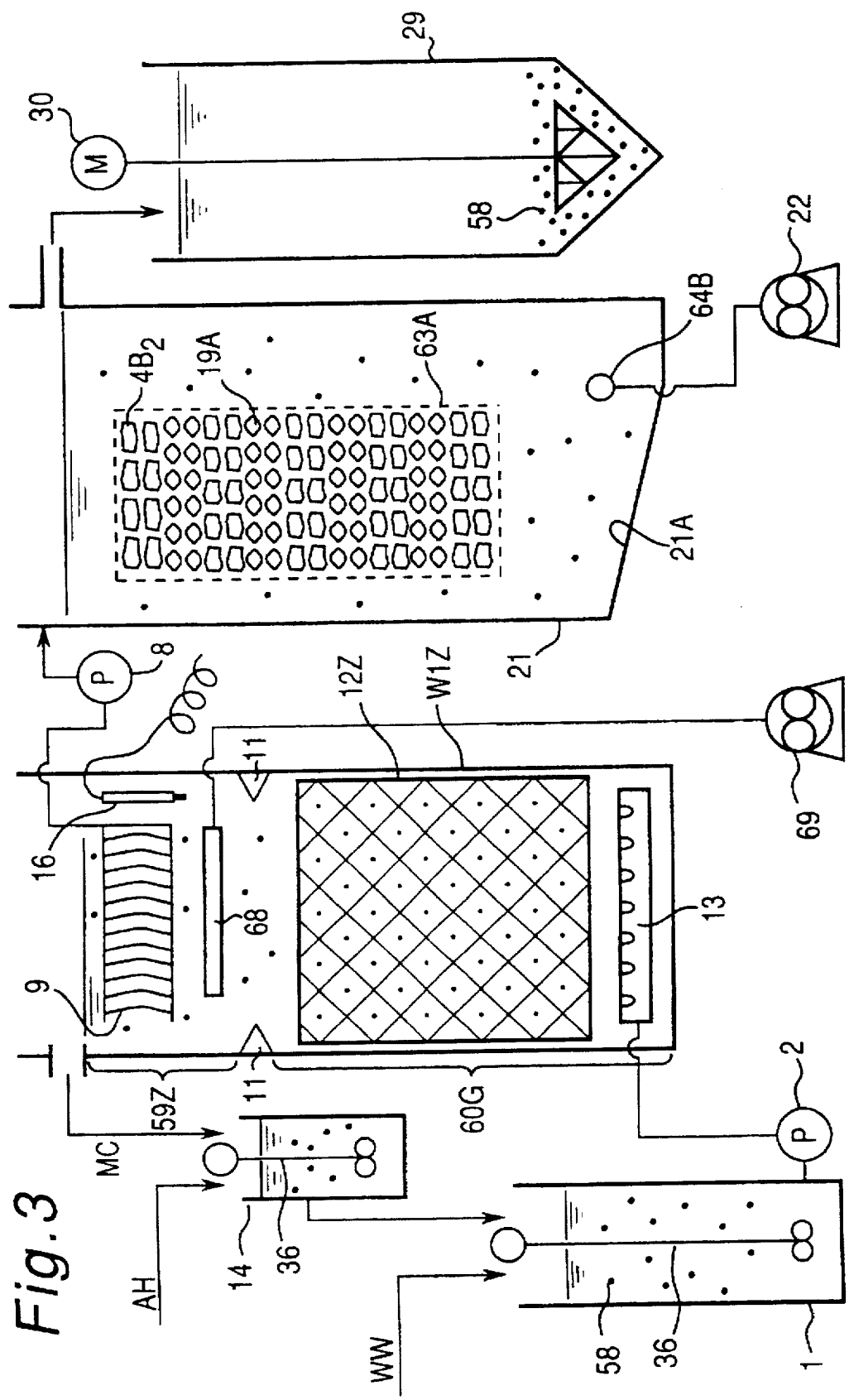
FIG. 3 is a schematic diagram showing a third embodiment of the wastewater treatment apparatus of the invention.

Next, a third embodiment of the wastewater treatment apparatus of the invention is shown in FIG. 3. This third embodiment is such that the denitrification tank 24, the third bioreactor B3, the first reaction/sprinkling portion 3 of the first bioreactor B1, and the second reaction/sprinkling portion 17 of the second bioreactor B2 are eliminated from the second embodiment shown in FIG. 2. Therefore, unlike the second embodiment, this third embodiment has no function of treating exhaust gas. Further, since the third embodiment has neither the denitrification tank 24 nor the third bioreactor B3, the embodiment is inferior to the second embodiment in respect of high level treatment of nitrogen compounds. Nevertheless, according to the third embodiment as well, developer-containing wastewater, which is high-concentration organic wastewater, flows into the lower portion 60G of the first submerged portion W1Z; and in the lower portion 60G (anaerobic portion), organic substances, for the most part, are anaerobically digested effectively by highly concentrated anaerobic bacteria grown in the granular sludge dominated by anaerobic bacteria. Then, the water under treatment flows upward to the upper portion 59Z of the first submerged portion W1Z, in which organic substances in the developer-containing wastewater are biologically treated by aerobic bacteria grown in the upper portion 59Z. In the upper portion 59Z, organic matter can be treated by aerobic bacteria. In particular, nitrogen compounds (TMAH, ammonia nitrogen, and nitrite nitrogen, etc.) can be oxidation-treated. Further, while nitrate nitrogen, a nitrogen compound generated after the oxidation treatment, circulates in a system which consists of the first submerged portion W1Z, the alcohol/ membrane-concentrated-liquid mixing tank 14, and the storage tank 1, the water under treatment is completely denitrified to a target water quality. After organic substances contained in the water under treatment are treated in the first submerged portion W1Z, the water is introduced into the second submerged portion 21 in which the organic substances are first adsorbed by charcoal 4B2 because of its organic matter adsorptivity. The adsorbed organic substances are biologically treated by microorganisms grown on the charcoal 4B2. More specifically, because many kinds of microorganisms grow on the surfaces of the charcoal 4B2, as well as in its interior, biofilm layers are created, so that a trace amount of TMAH, BOD, SS, less decomposable surfactants, and color components (which are measured in the name of chromaticity) are treated. On the other hand, trace amounts of ammonia nitrogen and nitrite nitrogen which have biological toxicity are subjected to further oxidation treatment and become non-toxic nitrate nitrogen. Since the second submerged portion 21 has charcoal 4B2, the color component adsorptivity of the charcoal 4B2 is advantageously utilized for economical treatment of the color of wastewater which has a chromaticity of less than 4,500° in the original wastewater state, such as developer-containing wastewater. In this way, according to the arrangement of the third embodiment, a wastewater treatment apparatus which is capable of treating developer-containing wastewater, or a high-concentration organoalkaline wastewater, under economically advantageous conditions, i. e., without dilution, with no chemical use, and with no excess sludge, and which is compact in construction.

According to this third embodiment, aerobic bacteria contained in the membrane concentrated liquid in the upper portion 59Z of the first submerged portion W1Z are caused to die under the sterilizing effect of the alcohol in the alcohol/membrane-concentrated-liquid mixing tank 14, whereby generation and growth of the anaerobic microorganisms can be advanced. Further, according to the arrangement of the embodiment, an alcohol as a hydrogen donor, soluble organic matter having a molecular weight of 3000 or more, colloidal organic matter, biofilm sludge and fine powder that can act as nuclei, are mixed together, and the resulting mixture is introduced into the storage tank 1. Therefore, a developer-containing wastewater, after subjected to mixing and stirring in the storage tank 1, is already of a configuration different, both chemically and physically, from its original configuration. Therefore, granular sludge principally of anaerobic bacteria can be easily created in the lower portion 60 of the first submerged portion W1Z.

In this embodiment, the lower portion 60G of the first submerged portion W1Z is an aerobic portion having granular sludge 12Z dominated by anaerobic bacteria. Therefore, it is possible to treat high-concentration developer-containing wastewater to the denitrified condition without dilution, without use of chemicals, and without generation of excess sludge. Further, provision of the membrane filter 9 in the upper portion 59 ensures stable maintenance of water quality and attains a compact wastewater treatment apparatus.

FIG. 3A shows a modification of the apparatus of FIG. 3. The modification is designed to return sludge containing biofilm sludge and the fine powder 58 from the settling tank 29 to the first submerged portion W1Z of the first bioreactor by means of the pump 31 and a return pipe T3. In this modification, the fine powder 58 is initially added to the mixing tank 14. But, the fine powder 58 can be added to any one of the tanks.

Experimental Example

Next, experiments made with respect to quality of treated water and concentration of treated gas as treated by an apparatus according to the arrangement of the first embodiment of FIG. 1 will be explained in comparison with experiments made with respect to quality of treated water as treated by a conventional apparatus shown in FIG. 5.

In the experiments, the capacity of the first submerged portion W1 was 1.3 m$^3$. Capacities of other components were: the second contact/circulation portion 21, 0.6 m$^3$; the denitrification tank 24, 0.4 m$^3$; the third contact/circulation portion 28, 0.3 m$^3$; the settling tank 29, 0.1 m$^3$; the first reaction/sprinkling portion 3, 0.6 m$^3$; the second reaction/sprinkling portion 17, 0.3 m$^3$; the third reaction/sprinkling portion 27, 0.15 m$^3$; and the hydroponic portion 54, 0.5 m$^3$. Transparent roof 66 at the top of the hydroponic portion 54 was comprised of an acrylic transparent plate pervious to sunlight.

Figure 5:
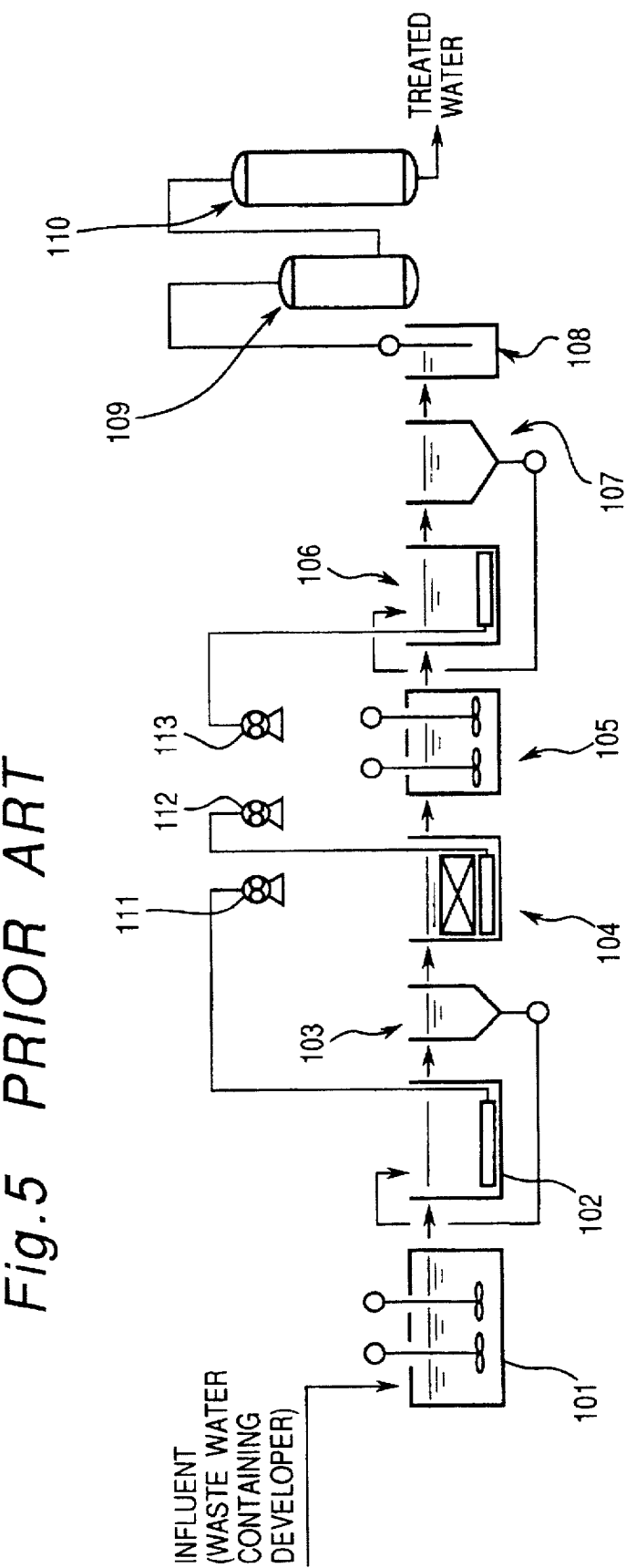
FIG. 5. is a schematic view showing a conventional wastewater treatment apparatus having a wastewater treating capability of substantially the same level as that of the first embodiment.

On the other hand, an experimental apparatus according to the prior art arrangement of FIG. 5 was constructed in a reduced size. The quality of water as treated by the experimental apparatus in a predetermined process flow of treatment was confirmed on the basis of water quality data. Data on treated water as treated by the experimental unit of the invention were compared with data on treated water as treated by the prior art experimental unit. For experiments by the embodiment unit, trial run was made for about three months. Collection of data was made after the end of the trial run. After developer-containing wastewater was introduced into the submerged portion W1 of the first bioreactor B1, and trial run was carried out for about 3 months, water quality was stabilized. For the "Binchotan" charcoal to be loaded in the second contact/circulation portion 21 and the contact/circulation portion 28, one carbonized at about 1000° C. was used. For the oyster shell, as calcium carbonate mineral, was used oyster shell of Toba (Mie-prefecture, Japan) origin which had been allowed to stand on land for 12 months and which was almost odor-free. Household surplus sludge was introduced at and after the outset of the trial run, and an indication was gradually seen that granular sludge was being formed in the submerged portion W1 of the first bioreactor B1. At the outset, no change was observed with "Binchotan" charcoal and oyster shell, but after the lapse of more than one month, something like biofilms was formed on their surfaces, though slight. The biofilm was not so much thick as those to be seen in conventional wastewater treatment, of the rotating biological contactor system or submerged biofilter system, but was found to be a unique, thin biofilm of charcoal or oyster shell base.

After completion of the trial run, measurement was made with respect to the quality of developer-containing wastewater flowing into the storage tank 1, and the quality of treated water (water quality at the exit of the settling tank 29), for 3 days. Summarized measurement data are shown below. Measurements were made also with respect to organic matter-containing exhaust gas. It is noted that when concentration of organic matter-containing gas was measured at the entrance and at the exit, it was arranged that there was no effect of the air due to the blower.

<Quality of developer-containing wastewater introduced into the embodiment apparatus of FIG. 1>

| | |
|---|---|
| pH | 12.3 or less *1 |
| BOD | 2500 ppm or less |
| COD | 2600 ppm or less |
| TOC *2 | 4000 ppm or less |
| TMAH | 7800 ppm or less |
| SS | 35 ppm or less |
| Total nitrogen | 800 ppm or less |
| Cationic surfactant | 33 ppm or less |
| Anionic surfactant | 6 ppm or less |
| Chromaticity | 4500° or less |

<Water quality at the exit of settling tank 29 of the first embodiment apparatus of FIG. 1>

| | |
|---|---|
| pH | 6.4–8.6 |
| BOD | 5 ppm or less |
| COD | 5 ppm or less |
| TOC | 5 ppm or less |
| TMAH | 1 ppm or less |
| SS | 10 ppm or less |
| Total nitrogen | 20 ppm or less |
| Cationic surfactant | 0.4 ppm or less |
| Anionic surfactant | 0.2 ppm or less |
| Chromaticity | 5° or less |

<Water quality at the exit of FIG. 5 prior art activated carbon adsorption tower>

| | |
|---|---|
| pH | 7.2–8.6 |
| BOD | 5 ppm or less |
| COD | 5 ppm or less |
| TOC | 5 ppm or less |
| TMAH | 1 ppm or less |
| SS | 5 ppm or less |
| Total nitrogen | 20 ppm or less |
| Cationic surfactant | 0.4 ppm or less |
| Anionic surfactant | 0.2 ppm or less |
| Chromaticity | 5° or less |

*1 (Generally, in wastewater treating industry, it is common that maximum value is given, with the words "or less" attached after the figure.)
*2 TOC stands for "total organic carbon".

As is apparent from the above experimental results, the water quality at the exit of the settling tank 29 of the wastewater treatment apparatus according to the first embodiment of the invention was satisfactory, with more than 99% TMAH eliminated. BOD was lowered more than 99%. Total nitrogen was more than 95% eliminated. Surfactant was more than 95% removed. Chromaticity was lowered more than 99%. That is, a water quality of the same level as that of the prior art was obtained.

Measurements with respect to exhaust gas were as follows.

<Exhaust gas concentration at entrance of the first, second and third reaction/sprinkling portions>

| | |
|---|---|
| Concentration of isopropyl alcohol (exhaust gas) | 3 ppm or less |

<Exhaust gas concentration at exit of the first, second and third reaction/sprinkling portions>

| | |
|---|---|
| Concentration of isopropyl alcohol | 1 ppm or less |

As is apparent from the above results, exhaust gas concentration at the exit of the first, second and third reaction/sprinkling portions were more than 60% lower than the concentration at the entrance.

As is apparent from the foregoing experiment results, developer-containing wastewater having nitrogen, color component and surfactant contents was surely treated. Exhaust gas containing organic solvents, such as IPA, was also surely treated. Therefore, according to the foregoing arrangements, exhaust gas and wastewater can be simultaneously treated in a simpler and more economical way than by the conventional treating apparatuses.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for wastewater treatment, comprising:
   a storage tank to which wastewater to be treated is introduced, the storage tank having agitation means;
   a first bioreactor having a first wastewater treatment portion which includes an anaerobic portion for anaerobically treating the wastewater introduced from the storage tank and an aerobic portion for aerobically treating the wastewater already treated in the anaerobic portion, wherein the aerobic portion includes a membrane filter and the wastewater passing through the membrane filter is discharged from the first bioreactor;
   a mixing tank to which a membrane concentrated liquid produced by the membrane filter in the aerobic portion of the first bioreactor, an alcohol, and fine powered material are introduced to be mixed therein, the mixing tank supplying the resulting mixture to the storage tank;
   a second bioreactor having a second wastewater treatment portion for aerobically treating the wastewater received from the first bioreactor, the second wastewater treatment portion containing charcoal and calcium carbonate mineral; and
   means for introducing the wastewater from the storage tank into the first bioreactor, and from the first bioreactor into the second bioreactor.

2. The apparatus for wastewater treatment as set forth in claim 1, further comprising:
   means for returning the wastewater discharged from the second bioreactor to the first bioreactor, the discharged wastewater containing biofilm sludge and the fine powdered material.

3. The apparatus for wastewater treatment as set forth in claim 1, wherein the aerobic portion of the first bioreactor further includes vinylidene chloride fillers placed below the membrane filter.

4. The apparatus for wastewater treatment as set forth in claim 1, wherein the membrane filter is comprised of either an ultrafilter membrane or a precision filter membrane.

5. The apparatus for wastewater treatment as set forth in claim 1, wherein the first bioreactor further comprises:
   a first exhaust gas treatment portion disposed above the aerobic portion for treating exhaust gas, the first exhaust gas treatment portion being packed with charcoal and plastic fillers;
   means for introducing exhaust gas into a lower portion of the first exhaust gas treatment portion such that the introduced exhaust gas goes upward through the charcoal and plastic fillers in the first exhaust gas treatment portion;
   means for returning the wastewater discharged from the second bioreactor to the first bioreactor; and
   sprinkling means for sprinkling the return wastewater on the charcoal and the plastic fillers in the first exhaust gas treatment portion such that the sprinkled wastewater goes downward through the charcoal and plastic fillers while coming into contact therewith before the wastewater falls into the aerobic portion.

6. The apparatus for wastewater treatment as set forth in claim 1, wherein the second bioreactor further comprises:
- a second exhaust gas treatment portion disposed above the second wastewater treatment portion for treating exhaust gas, the second exhaust gas treatment portion being packed with charcoal and plastic fillers;
- means for introducing exhaust gas into a lower portion of the second exhaust gas treatment portion such that the introduced exhaust gas goes upward through the charcoal and plastic fillers in the second exhaust gas treatment portion; and
- sprinkling means for sprinkling the wastewater coming from the second wastewater treatment portion on the charcoal and the plastic fillers in the second exhaust gas treatment portion such that the sprinkled wastewater goes downward through the charcoal and plastic fillers while coming into contact therewith before the wastewater falls into the second wastewater treatment portion.

7. The apparatus for wastewater treatment as set forth in claim 1, further comprising a denitrification tank for denitrifying the wastewater received from the second bioreactor, the denitrification tank containing denitrifying bacteria, the fine powdered material, vinylidene chloride fillers, and circulation means for circulating the wastewater in the denitrification tank so as to allow the wastewater to pass through the vinylidene chloride fillers.

8. The apparatus for wastewater treatment as set forth in claim 7, further comprising a third bioreactor which includes:
- a third wastewater treatment portion for treating the wastewater received from the denitrification tank, the third wastewater treatment portion containing charcoal and plastic fillers;
- a third exhaust gas treatment portion located above the third wastewater treatment portion;
- means for introducing exhaust gas into a lower portion of the third exhaust gas treatment portion such that the introduced exhaust gas goes upward through the charcoal and plastic fillers in the third exhaust gas treatment portion;
- a hydroponic portion located adjacent the third exhaust gas treatment portion, within which plants are hydroponically cultivated by the wastewater supplied from the third wastewater treatment portion; and
- pumping means for pumping up the wastewater from the third wastewater treatment portion to the hydroponic portion,
- the hydroponic portion outputting the wastewater therein to the third exhaust gas treatment portion, and
- the exhaust gas passed through the charcoal and plastic fillers in the third exhaust gas treatment portion entering the hydroponic portion to come into contact with leaves of the plants.

9. The apparatus for wastewater treatment as set forth in claim 8, further comprising:
- a settling tank for separating sludge from the wastewater received from the third bioreactor, the sludge containing a biofilm sludge and the fine powdered material;
- sludge return means for returning the sludge from the settling tank to at least one of the first exhaust gas treatment portion, the second exhaust gas treatment portion, the denitrification tank and the third exhaust gas treatment portion.

10. A method for wastewater treatment, comprising the steps of:
- mixing an alcohol with wastewater to be treated and introducing the mixture into an anaerobic lower portion of a first bioreactor;
- aerobically treating the wastewater reaching an aerobic upper portion of the first bioreactor from the anaerobic lower portion;
- passing the aerobically treated wastewater through a membrane filter to obtain a filtrate and a membrane concentrated liquid;
- introducing the filtrate into a wastewater treatment portion of a second bioreactor which contains charcoal and calcium carbonate mineral, and aerobically treating the filtrate through an action of aerobic microorganisms grown on the charcoal and calcium carbonate mineral; and
- mixing the membrane concentrated liquid with the alcohol, then blending the mixture of the alcohol and the membrane concentrated liquid with wastewater to be treated, then introducing the blend into the anaerobic lower portion to produce granulated sludge.

11. The method for wastewater treatment as set forth in claim 10, further comprising the step of introducing a fine powdered material into the anaerobic lower portion of the first bioreactor.

12. The method for wastewater treatment as set forth in claim 10, wherein an exhaust gas treatment portion packed with charcoal and plastic fillers is provided above the aerobic upper portion, the method further comprising the steps of:
- sprinkling the wastewater discharged from the wastewater treatment portion of the second bioreactor on the charcoal and plastic fillers in the exhaust gas treatment portion; and
- introducing exhaust gas into a lower portion of the exhaust gas treatment portion to let the introduced exhaust gas upward through the charcoal and plastic fillers in the exhaust gas treatment portion.

* * * * *